(12) United States Patent
Proksch et al.

(10) Patent No.: US 7,271,582 B2
(45) Date of Patent: Sep. 18, 2007

(54) LINEAR VARIABLE DIFFERENTIAL TRANSFORMERS FOR HIGH PRECISION POSITION MEASUREMENTS

(75) Inventors: Roger Proksch, Santa Barbara, CA (US); Jason Cleveland, Ventura, CA (US); Dan Bocek, Goleta, CA (US)

(73) Assignee: Asylum Research Corporation, Santa Barbara, CA (US)

( * ) Notice: Subject to any disclaimer, the term of this patent is extended or adjusted under 35 U.S.C. 154(b) by 0 days.

(21) Appl. No.: 11/401,781

(22) Filed: Apr. 10, 2006

(65) Prior Publication Data

US 2006/0186876 A1 Aug. 24, 2006

Related U.S. Application Data

(60) Continuation of application No. 10/683,592, filed on Oct. 10, 2003, now Pat. No. 7,038,443, which is a division of application No. 10/016,475, filed on Nov. 30, 2001.

(60) Provisional application No. 60/250,313, filed on Nov. 30, 2000, provisional application No. 60/332,243, filed on Nov. 16, 2001.

(51) Int. Cl.
*G01B 7/14* (2006.01)

(52) U.S. Cl. .................. 324/207.18; 324/207.24; 340/870.36

(58) Field of Classification Search ........... 324/207.12, 324/207.13, 207.15, 207.16, 207.17, 207.18, 324/207.24, 207.25; 340/870.36
See application file for complete search history.

(56) References Cited

U.S. PATENT DOCUMENTS 2,364,237 A 12/1944 Neff
2,452,862 A 11/1948 Neff (Continued)

OTHER PUBLICATIONS

Bertram, H.N., *Theory of Magnetic Recording*, Cambridge University Press, Cambridge, England, pp. 112-119, (1994).

(Continued)

*Primary Examiner*—Jay M Patidar
(74) *Attorney, Agent, or Firm*—Fish & Richardson P.C.

(57) ABSTRACT

A linear variable transformer (LVDT) for use in a transducer. The LVDT has a non-ferromagnetic core which may eliminate Barkhausen noise and thereby improve the sensitivity of the resulting measurements. In one aspect, this system may be used in an atomic force microscope.

10 Claims, 21 Drawing Sheets

U.S. PATENT DOCUMENTS

| | | | |
|---|---|---|---|
| 2,503,851 | A | 4/1950 | Snow |
| 2,564,221 | A | 8/1951 | Hornfeck |
| 3,005,969 | A | 10/1961 | Wysocki |
| 3,100,292 | A * | 8/1963 | Warner, Jr. et al. ......... 367/185 |
| 3,662,306 | A * | 5/1972 | Heinis ........................ 336/119 |
| 3,891,918 | A | 6/1975 | Ellis |
| 3,921,114 | A | 11/1975 | Bridewell et al. |
| 3,986,105 | A | 10/1976 | Nix et al. |
| 4,030,085 | A | 6/1977 | Ellis et al. |
| 4,634,126 | A | 1/1987 | Kimura |
| 4,667,158 | A | 5/1987 | Redlich |
| 4,669,300 | A | 6/1987 | Hall et al. |
| 4,705,971 | A | 11/1987 | Nagasaka |
| 5,046,427 | A | 9/1991 | Rowzee et al. |
| 5,046,702 | A | 9/1991 | Miyazawa et al. |
| 5,256,969 | A | 10/1993 | Miyajima et al. |
| RE34,489 | E | 12/1993 | Hansma et al. |
| 5,294,850 | A | 3/1994 | Weh et al. |
| 5,381,089 | A | 1/1995 | Dickmeyer et al. |
| 5,414,939 | A | 5/1995 | Waugaman |
| 5,432,444 | A | 7/1995 | Yasohama et al. |
| 5,461,319 | A | 10/1995 | Peters |
| 5,465,046 | A | 11/1995 | Campbell et al. |
| 5,469,053 | A | 11/1995 | Laughlin |
| 5,477,473 | A | 12/1995 | Mandl et al. |
| 5,513,518 | A | 5/1996 | Lindsay |
| 5,705,741 | A | 1/1998 | Eaton et al. |
| 5,739,686 | A | 4/1998 | Naughton et al. |
| 5,767,670 | A | 6/1998 | Maher et al. |
| 5,777,468 | A | 7/1998 | Maher |
| 5,948,972 | A | 9/1999 | Samsavar et al. |
| 6,043,573 | A | 3/2000 | Neff et al. |
| 6,267,005 | B1 | 7/2001 | Samsavar et al. |
| 7,038,443 | B2 | 5/2006 | Proksch et al. |
| 7,165,445 | B2 | 1/2007 | Bocek et al. |
| 2002/0175677 | A1 | 11/2002 | Proksch et al. |
| 2003/0209060 | A1 | 11/2003 | Proksch |
| 2004/0056653 | A1 | 3/2004 | Bocek et al. |
| 2004/0075428 | A1 | 4/2004 | Proksch et al. |
| 2004/0079142 | A1 | 4/2004 | Proksch |
| 2004/0206166 | A1 | 10/2004 | Proksch et al. |
| 2005/0188752 | A1 | 9/2005 | Bocek et al. |
| 2006/0186877 | A1 | 8/2006 | Proksch et al. |
| 2006/0186878 | A1 | 8/2006 | Proksch et al. |
| 2006/0192551 | A1 | 8/2006 | Proksch et al. |
| 2006/0202683 | A1 | 9/2006 | Proksch et al. |

OTHER PUBLICATIONS

Bozorth, R.M., *Ferromagnetism*, Princeton, NJ, Van Nostrand, pp. 524-532, (1951).

Crommie, M.F., et al., "Confinement of Electroncs to Quantum Corrals on a Metal Surface", *Science*, vol. 262, pp. 218-220, (Oct. 8, 1993).

Drexler, K Eric, "Molecular directions in nanotechnology", *Nanotechnology*, vol. 2, pp. 113-118, (1991).

Hristoforou, E., H., et al., "A Low Core Mass Linear Variable Differential Transformers Sensor Using Amorphous Wires", *Romanian Journal of Physics*, 41(9-10):765-769, (1996).

Kano, Y., et al., "New Type LVDT Position Detector", *CPEM '88 Digest: 1988 Conference on Precisions Electromagnetic Measurements*, Ed. Yasuharu Suematsu, Tsukuba, Japan, Tsukuba Research Center, pp. 95-96, (1988).

Meydan, T., et al., "Linear variable differential transformer (LVDT): linear displacement transducer utilizing ferromagnetic amourphous metallic gas ribbons", *Sensors and Actuators A: Physical*, 32(1-3):582-587, (Apr. 1992).

Midgley, G.W., et al., "Improved Linearity Linear Variable Differential Transformers (LVDTs) Through the Use of Alternative Magnetic Materials", *Electric and Magnetic Fields: From Numerical Models to Industrial Applications*, Ed. André Nicolet and R. Belmans, New York, NY, Plenum Press, pp. 311-314, (1995).

Park, Young Tae, et al., "Study on a Linear Variable Differential Transformer for Precision Measurements", *Korean Applied Physics*, 2(4):347-351, (Nov. 1989).

Piner, Richard D., et al., "'Dip-Pen' Nanolithography", *Science*, vol. 283, pp. 661-663, (Jan. 29, 1999).

Saxena, Suresh C., et al., "A Self-Compensated Smart LVDT Transducer", *IEEE Transactions on Instrumentation and Measurement*, 38(3):748-753, (Jun. 1989).

Herceg, E.E., "An LVDT Primer", *Sensors*, pp. 27-30 (1996).

Sydenham, P.H., et al., "Low-cost, precision, flat inductive sensor", *Measurement*, 15(3) 179-188, Jun. 1995.

* cited by examiner

LINEAR VARIABLE DIFFERENTIAL TRANSFORMERS FOR HIGH PRECISION POSITION MEASUREMENTS

CROSS-REFERENCE TO RELATED APPLICATIONS

This application is a continuation of U.S. patent application Ser. No. 10/683,592, filed Oct. 10, 2003, now U.S. Pat. No. 7,038,443 which is a divisional of U.S. patent application Ser. No. 10/016,475, filed Nov. 30, 2001, which claims the benefit of U.S. provisional application No. 60/250,313, filed Nov. 30, 2000, and U.S. provisional application No. 60/332,243, filed on Nov. 16, 2001. The disclosures of the prior applications are considered part of (and are incorporated by reference in) the disclosure of this application.

BACKGROUND OF THE INVENTION

The present invention relates generally to devices that convert very small mechanical displacements, as small as the sub-nanometer level, into differential voltages, and vice versa.

One position sensor that has been available since early in the last century to convert mechanical displacements into differential voltages, and vice versa, is the linear variable differential transformer (LVDT). In the conventional commercially available LVDT (Part Number 50-00-005XA, Sentech Inc, North Hills, Pa.) depicted in FIG. 1, a moving, ferromagnetic core 1 differentially couples magnetic flux from a primary coil 2 to two secondary coils 3 and 4. A current is driven through the primary coil by an oscillator 5. As the position of the core changes with respect to the secondary coils, the flux coupled to the two secondaries changes. These voltages are amplified with a differential amplifier 6 and converted to a voltage proportional to the core displacement by the signal conditioning electronics 7. For small displacements, the signal is linear. The moving core is mechanically connected to the object of interest by a shaft 8. The coils are housed in a shell that also often acts as a magnetic shield 9. Because the core 1 is a magnetically soft ferromagnet, it is often desirable to shield it from external magnetic fields. The best commercially available LVDTs are limited to a spatial resolution of 2.5 nm operating in a ±500 nm range at a bandwidth of 100 Hz (Lion Precision Model AB-01, Lion Precision, St. Paul, Minn.).

Another position sensor that can convert mechanical displacements into differential voltages is one employing capacitive technology. Commercially available capacitive sensors operating in circumstances analogous to commercially available LVDTs have surpassed LVDT performance by nearly an order of magnitude despite relying on signal conditioning circuitry of the same type as that employed for LVDTs (see, for example, the Physik Instrumente Catalog, 2001 edition). Consequently, even though they are difficult to work with and substantially more costly (because of more demanding manufacturing requirements), capacitive sensors are often the components of choice in applications that require the highest measurement resolution and bandwidth.

Because of their simplicity and low cost, it is of great interest to determine the sources of the limits in LVDT resolution and how those limitations might be overcome. As set forth more fully below, we have concluded that the limit on resolution in conventional LVDT resolution is Barkhausen noise in the ferromagnetic core. Barkhausen noise the name given to sudden jumps in the magnetic state of a ferromagnetic material (Bozorth). In ferromagnetic material, defects can lead to special sites where domain walls are preferentially pinned. The domain wall can then be depinned by thermal energy or an external magnetic field. When this happens, the domain wall will jump to another metastable pinning site, causing a sudden change in the overall magnetic state of the material. In general, when LVDT cores are formed from ferromagnetic material the flux changes due to Barkhausen noise will not cancel out in a differential measurement of the two secondaries. This uncanceled noise leads directly to noise in the core position signal. Furthermore, sudden changes in the magnetic state of the core can cause changes in the sensitivity of the sensor, again leading to positional noise.

There are a number of schemes to reduce Barkhausen (and electrical) noise in conventional LVDTs, including increasing the primary coil drive current and using amorphous magnetic materials in the core (Meydan, T., et al.; Hristoforou, E., et al.; and Midgley, G. W., et al.). While increasing the drive current will increase the signal to noise in conventional electronics, it is ineffective when dealing with Barkhausen noise because it creates a larger oscillating magnetic field that can in turn dislodge pinned domain walls more easily leading to increased positional noise. Using amorphous magnetic materials has been shown to reduce Barkhausen noise to a small degree but is ultimately ineffective because Barkhausen noise is a fundamental property of ferromagnetic materials.

Although without an understanding of Barkhausen noise issues, some non-conventional LVDT designs have eliminated its effects by substituting an air core for the ferromagnetic core of the conventional LVDT. These include a sensor designed for use in a very high magnetic field described by Ellis and Walstrom (U.S. Pat. No. 4,030,085), a pin-ball machine described by Kimura (U.S. Pat. No. 4,634,126) and a variety of mechanical gauging applications described by Neff (U.S. Pat. Nos. 2,364,237 and 2,452,862) and Snow (U.S. Pat. No. 2,503,851). The gauge described by Snow used an excitation scheme where two primary coils rather than one were excited. One coil was driven at 180 degrees from the other, resulting in oscillating magnetic fields from the two primaries that tend to cancel each other out. A single air core in the center was used as a detector. This is a different excitation scheme from the one usually used by us and others. Essentially, the roles of the primaries and secondaries are reversed. One might expect that from the reciprocity theorem (see, for example, Bertram, H. N., Theory of Magnetic Recording, Cambridge Press, 1994) that the electromagnetics of the two situations are identical. However, there are also some necessary differences in the noise performance associated with the signal conditioning. In general, the response of the sensors based on air core LVDTs in the prior art was significantly less sensitive than the improved sensor described here and would not be suitable for the sub-nanometer, high speed positioning performance we have obtained. Furthermore, the sensors described in the above prior art did not make use of any of the improvements we have incorporated into our excitation and signal conditioning electronics. The best performance claimed in these air-core LVDTs is comparable to current commercially available LVDTs.

Finally conventional LVDTs are also severely limited in the presence of an external magnetic field. As the external magnetic field increases, the core saturates and the LVDT becomes ineffectual. This limitation has been addressed by a non-conventional design in which the LVDT is fabricated entirely from non-ferromagnetic material and operated near the resonance of the primary and secondary coils (U.S. Pat.

No. 4,030,085). This design however shares other limitations of conventional LVDTs in its large length scale and, for this and other reasons, is even less sensitive than the conventional design.

Present and future nanotechnology depends on the ability to rapidly and accurately position small objects and tools. Current length scales in many manufacturing technologies are in the 100 nm range and shrinking. The recording head in a commercial hard disk drive, for example, has a write gap routinely less than 100 nm and has pole-tip recession controlled to tens of nanometers. The current generation of semiconductor integrated circuits uses 180 nm wide traces, with the move to 130 nm expected within two years and to 100 nm within five years (International Technology Roadmap for Semiconductors, 1999 edition). Current sensors employed to control and verify the lithographic processes used in disk drive and IC manufacturing is already only barely providing sufficient resolution for critical dimension measurements.

Recent experimental work has gone beyond these relatively large sub-micron scales. Examples include the controlled manipulation of clusters of molecules (Piner et al.) and even individual atoms (see for example, Crommie et al.). One goal of nanotechnology is to build molecular machines (Drexler, K. E.). If such devices are constructed, they will require precise positioning of individual atoms and molecules. This will require three-dimensional positional information with sub-Å precision and rapid response as even modest molecular machines in biological organisms can contain thousands of atoms.

SUMMARY OF THE INVENTION

An object of the present invention is to provide a simple, low cost and high resolution sensor that does not require the precision machining of other high-resolution position sensors or the careful selection, machining or treatment of the magnetic material used in conventional LVDT cores.

A second object is to provide a high-gain LVDT that does not suffer from Barkhausen noise.

Another objective is to provide a high-resolution sensor that is insensitive to temperature variations and does not itself cause temperature variations via eddy current heating of a high-permeability core.

Another objective is to provide a very high-resolution sensor that is suitable for integration with instruments requiring or benefiting from such resolution, including profilometers and scanning probe microscopes, such as atomic force microscopes and molecular force probes.

These and other objects are achieved according to the present invention by (i) replacing the high permeability core with a low permeability core that reduces or eliminates Barkhausen noise, (ii) reducing the length scale of the LVDT sensor to boost the spatial sensitivity and (iii) improvement in the signal conditioning circuitry.

DESCRIPTION OF THE PREFERRED EMBODIMENTS

Figure 2:
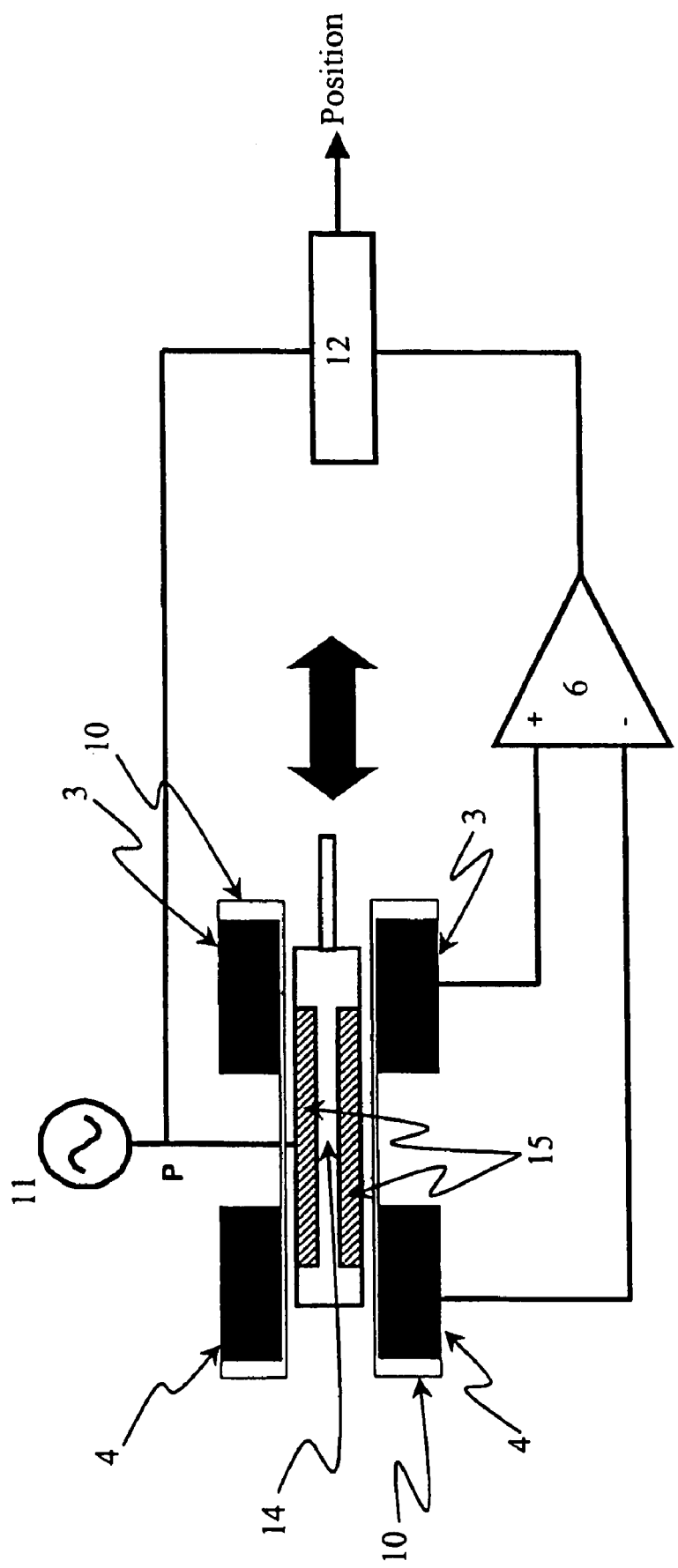
FIG. 2: Preferred embodiment of a low-permeability core LVDT with a moving primary.

FIG. 2 shows our improved LVDT position sensor. This LVDT comprises a non-ferromagnetic coil form 14 around which a moving primary coil 15 is wound and two stationary secondary coils 3 and 4 wound around a non-ferromagnetic coil form 10. The primary coil form 14 is mechanically connected to the object of interest (not shown) by a shaft 8. The shaft 8 can transmit displacements of the object of interest on the order of many microns or smaller. The coil forms can be made of any non-ferromagnetic material, including but not limited to, plastics, ceramics and composites without ferro-magnetic content, or paramagnetic material. Alternatively, the coil forms could be constructed from non-ferromagnetic adhesive and the winding or windings. Excitation electronics 11, more fully described below, produce the current driving the primary coil. As the position of the primary coil 15 changes with respect to the secondary coils 3 and 4, and therefore the object of interest attached to shaft 8, the flux coupled to the two secondaries changes. These voltages are amplified with a differential amplifier 6 and converted to a voltage proportional to the core displacement by the signal conditioning electronics 12, more fully described below. The arrangement of this LVDT removes ferromagnetic material from the active portion of the sensor. As discussed below, this improvement lowers the sensitivity gain provided by high permeability magnetic material but eliminates Barkhausen noise. The elimination of Barkhausen noise permits raising the level of excitation voltage 11 without causing a corresponding increase in output noise, thus increasing the sensitivity of the LVDT. It may be noted that the removal of ferromagnetic material from the active portion of the sensor confers a secondary advantage. There are no longer any constraints on the material chosen for the shell surrounding the LVDT, e.g. frame 16. Since there is no ferromagnetic material in the core, the sensitivity and noise of the preferred embodiment LVDT is insensitive to external magnetic fields, including those generated from the shell material.

Figure 3:
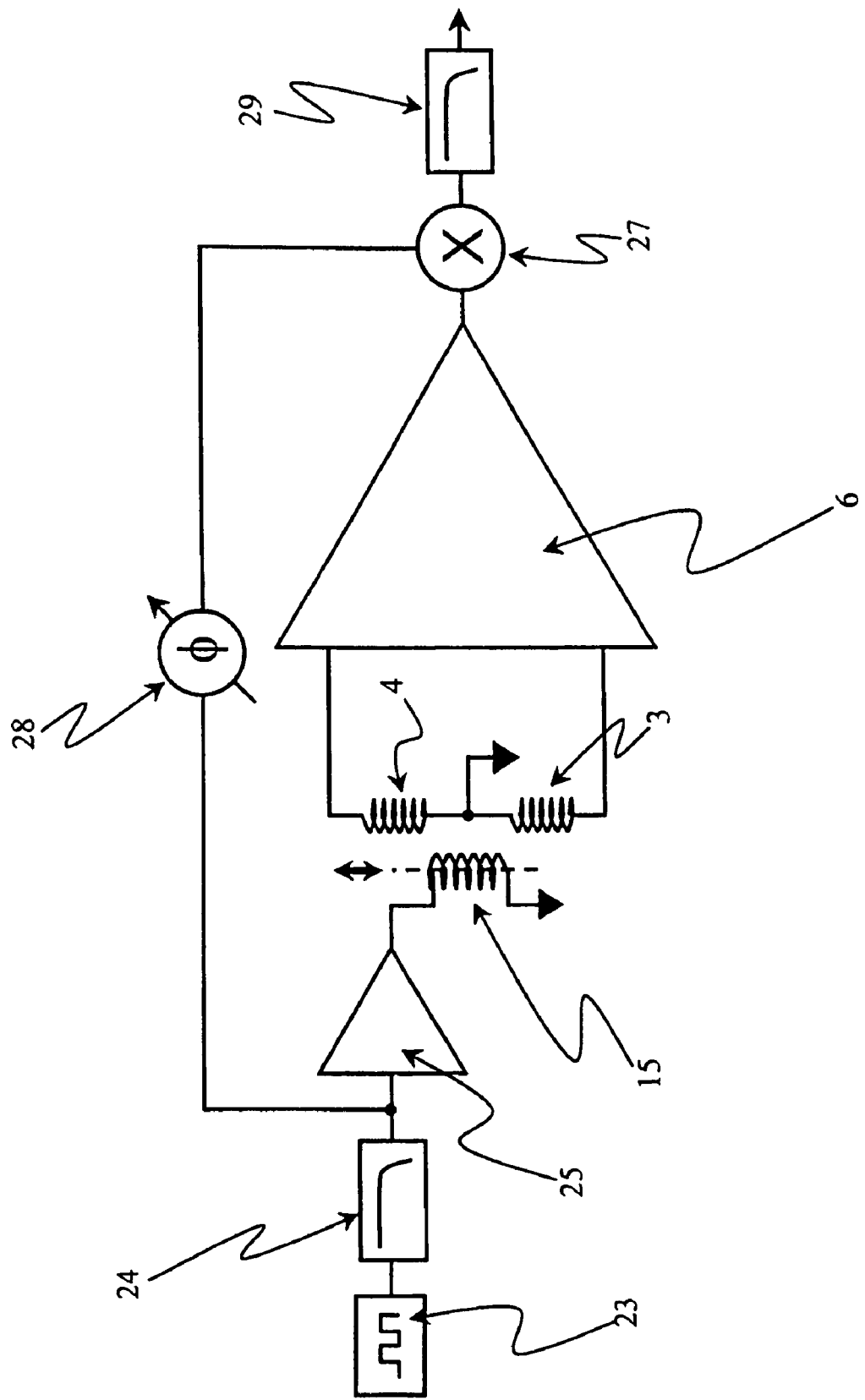
FIG. 3: The excitation and synchronous signal conditioning electronics based around an analog multiplier.
Figure 4:
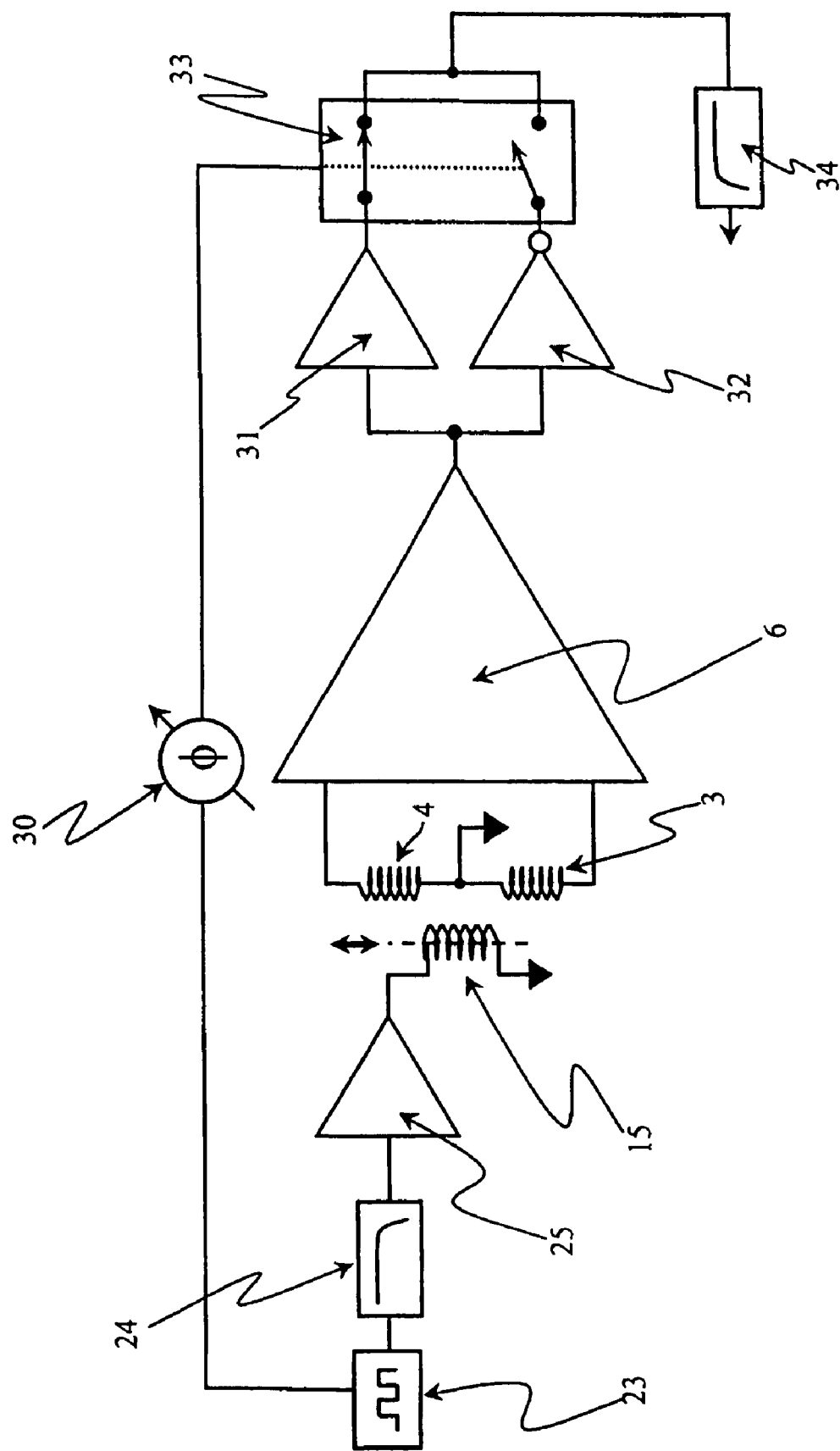
FIG. 4: The excitation and synchronous signal conditioning electronics based around a synchronous analog switch.

FIG. 3 and FIG. 4 show the excitation and signal conditioning electronics of our improved LVDT position sensor. Both circuits are based on a square wave oscillator 23, that provides an output at a precisely defined amplitude and frequency. The excitation electronics drive the LVDT primary 15 with a pure sine wave. For this purpose, a low pass filter 24 that effectively removes all the harmonics of the square wave above the fundamental is employed. The filter is optimized to be stable with respect to variations in temperature. The resulting high purity, low distortion sine wave is then amplified by a current buffer 25 that drives the LVDT primary 15. The end result of this portion of the circuit was a sine wave oscillator with exceptional frequency and amplitude stability.

FIG. 3 shows one version of the signal conditioning electronics of our improved LVDT position sensor. One end of each of the secondaries 3 and 4 is grounded and the connected to a high precision, low noise differential amplifier 6. This differential amplifier is designed to produce low noise when coupled to a low impedance input source (such as a coil). The output of the differential amplifier 6 is input to a low noise analog multiplier circuit 27. The output of the filter 24 goes through a low noise, precision phase shift circuit 28 and fed as the other input of the multiplier circuit 27. Finally, the output of the multiplier circuit 27 is filtered by another high precision, low noise, stable, low pass filter 29 to remove the frequency doubled component of the multiplier output. The output of this filter provides the synchronous signal proportional to the position of the moving primary coil 15. Alternatively to phase shifting the reference signal into the multiplier 27, it is possible to phase shift the signal going into the primary drive current buffer 25. All that matters is that the relative phase of the primary drive and the multiplier reference is adjustable.

FIG. 4 shows another version of the signal conditioning electronics of our improved LVDT position sensor. The electronics are similar to those of FIG. 3 up to the output of the differential amplifier 6. In FIG. 4 circuit, the output of the differential amplifier 26 goes into a buffer amplifier 31 and an inverting buffer amplifier 32. The output of the buffer amplifier 31 is fed into a normally closed input of an analog switch 33 while the output of the inverting buffer amplifier 32 is fed into a normally open input of the switch. This arrangement could be reversed with no loss of functionality. The action of the analog switch 33 is controlled by a square wave that originates in the square wave oscillator 23 which is phase shifted by a low noise, precision phase shift circuit 30 before being input to the analog switch 33 so that the two parts of the switch are set so that one part is open when the other part is closed. Preferably, the opening and closing of the two parts of switch 33 occurs 90 degrees out of phase with the output signal from amplifier 26. The output of the analog switch 33 is fed into a stable, low noise, low pass filter 34. As with the other version, the output of this filter provides the synchronous signal proportional to the position of the moving primary coil 15.

Figure 5:
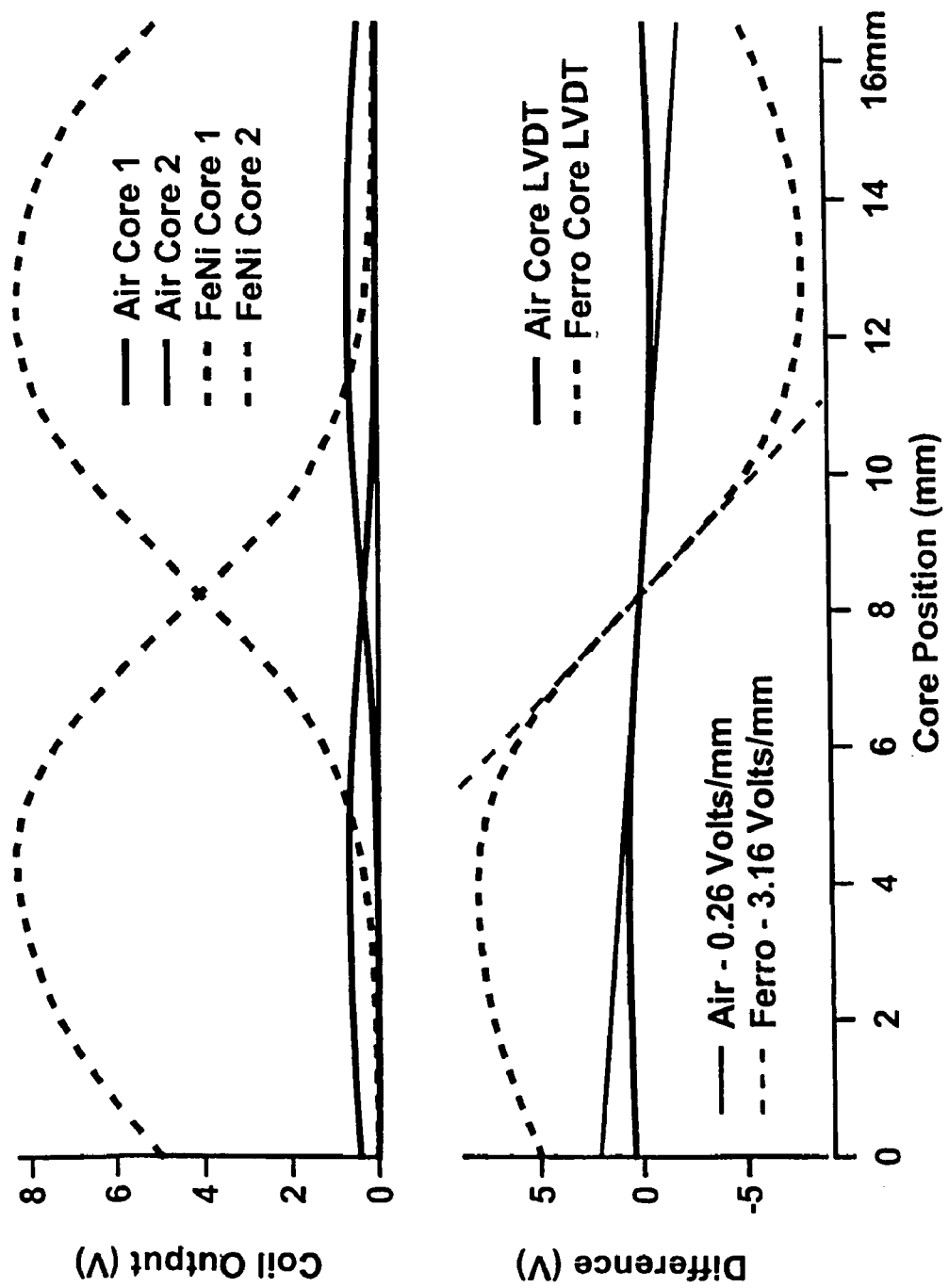
FIG. 5: The outputs of the two secondaries as a function of core (conventional LVDT) and primary (preferred embodiment) position.

The basic idea behind any LVDT is that the mutual inductances between a moving primary and two secondaries change as a function of position. The upper panel of FIG. 5 shows the induced voltage at the output of each secondary of a conventional LVDT and the described LVDT as a function of core position. In both cases, the secondaries were positioned so that the outputs cancel at the steepest part of the slope of the induced voltage. This insures that the sensitivity of the subtracted voltages to changes in core or moving primary position is as large as possible. The dashed lines show the response of the two secondaries in the conventional LVDT. The solid lines show the response of the two secondaries in our improved LVDT. The sensitivity of the LVDT can be calculated by simply subtracting the outputs of the two secondaries. This is shown for both cases in the lower panel of FIG. 5. The sensitivity for small excursions of the core around the center point can be measured by fitting a line around the center. In the case of the conventional LVDT, the raw sensitivity (i.e., slope of the subtracted curve near the zero point) was 3.16 Volts/mm and in the case of the improved LVDT it was 0.26 Volts/mm. This points to a notable advantage of using a ferromagnetic core. The permeability of the core materially enhances gain, increasing the sensitivity of the LVDT signal.

It is instructive to identify the limits on LVDT resolution. At least one manufacturer claims that its conventional LVDTs have "infinite resolution" and that any deviation from perfection is due to shortcomings in the signal conditioning or display (Lion Precision Model AB-01, Lion Precision, St. Paul, Minn.). This claim is puffery for at least two reasons. First, coils wound with wire will be subject to Johnson noise (Herceg, Edward E., An LVDT Primer, *Sensors*, p. 27-30 June (1996). noise. As a result, Johnson noise is present in both conventional LVDTs and in the LVDT described here. Johnson noise will translate into an electric signal at the output of the signal conditioning electronics that will be indistinguishable from actual motion of the sensor. Second, and probably most important for conventional LVDTs, the use of ferromagnetic materials introduces the phenomenon known as Barkhausen noise. If the ferromagnetic core were perfect, meaning that the permeability is constant and the magnetization changes in a perfectly linear and smooth manner, this phenomenon could be ignored. However, ferromagnetic materials are never perfect. Barkhausen noise is the name given to sudden jumps in the magnetic state of ferromagnetic material. Defects in ferromagnetic material can lead to special sites where domain walls are preferentially pinned. The domain wall can then be de-pinned by thermal energy or an external magnetic field. When this happens, the domain wall will jump to another metastable pinning site, causing a sudden change in the overall magnetic state of the material.

Figure 1:
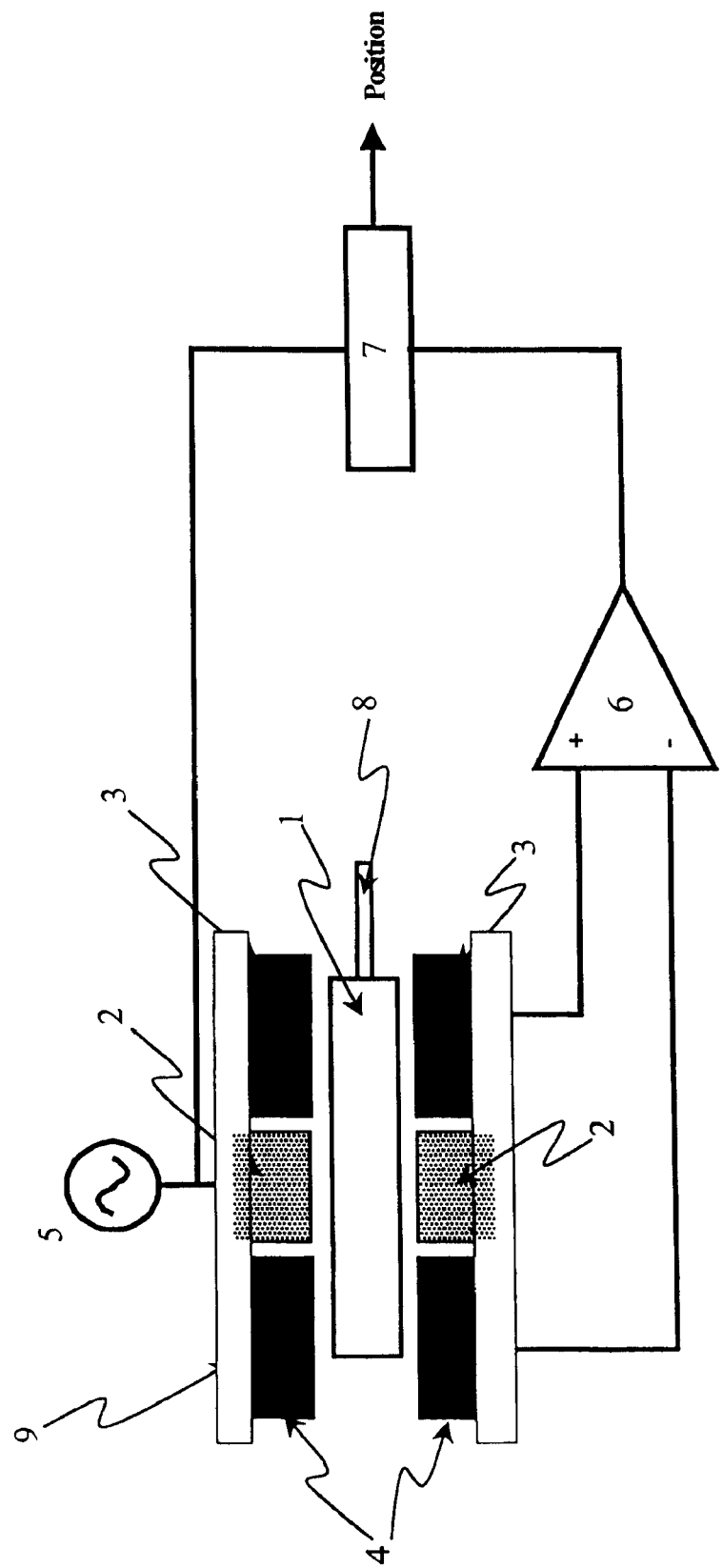
FIG. 1: Prior Art showing conventional LVDT.
Figure 6:
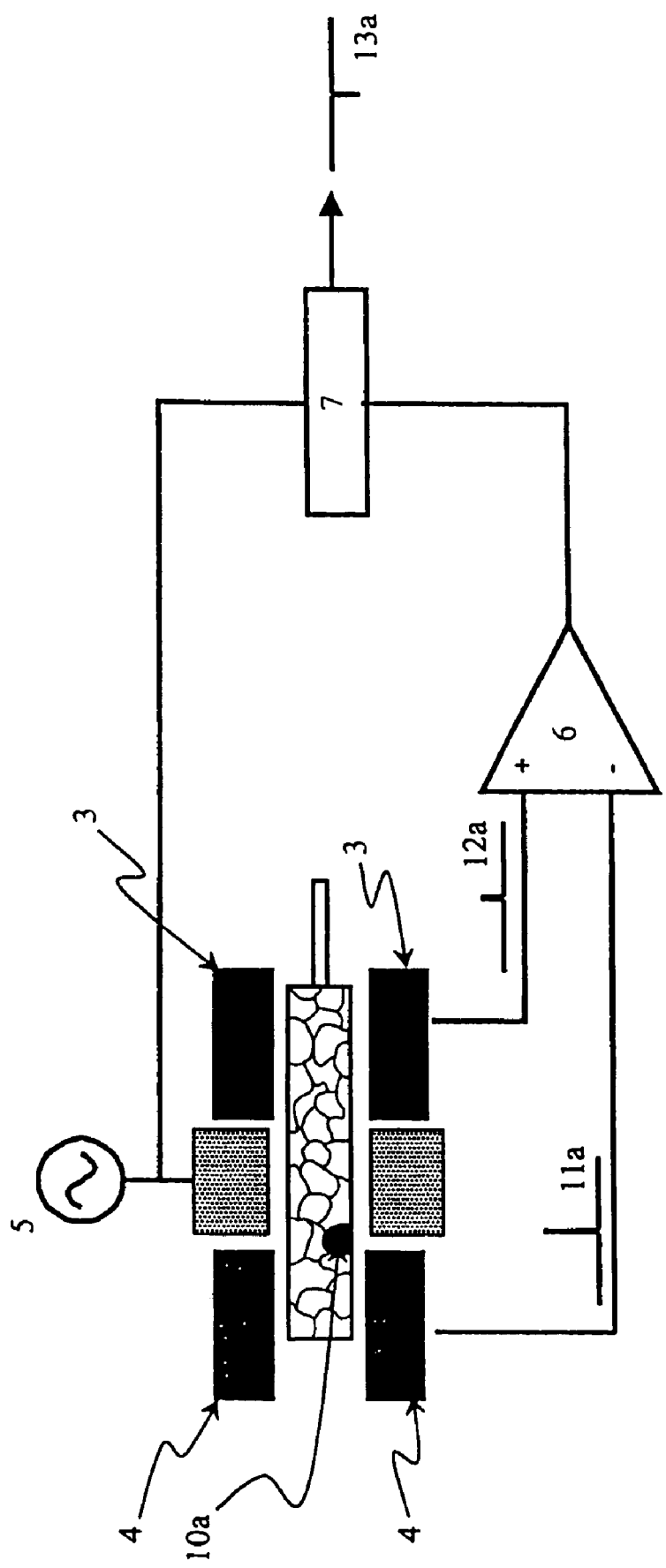
FIG. 6: Origins of differential Barkhausen noise in conventional LVDTs.
Figure 7:
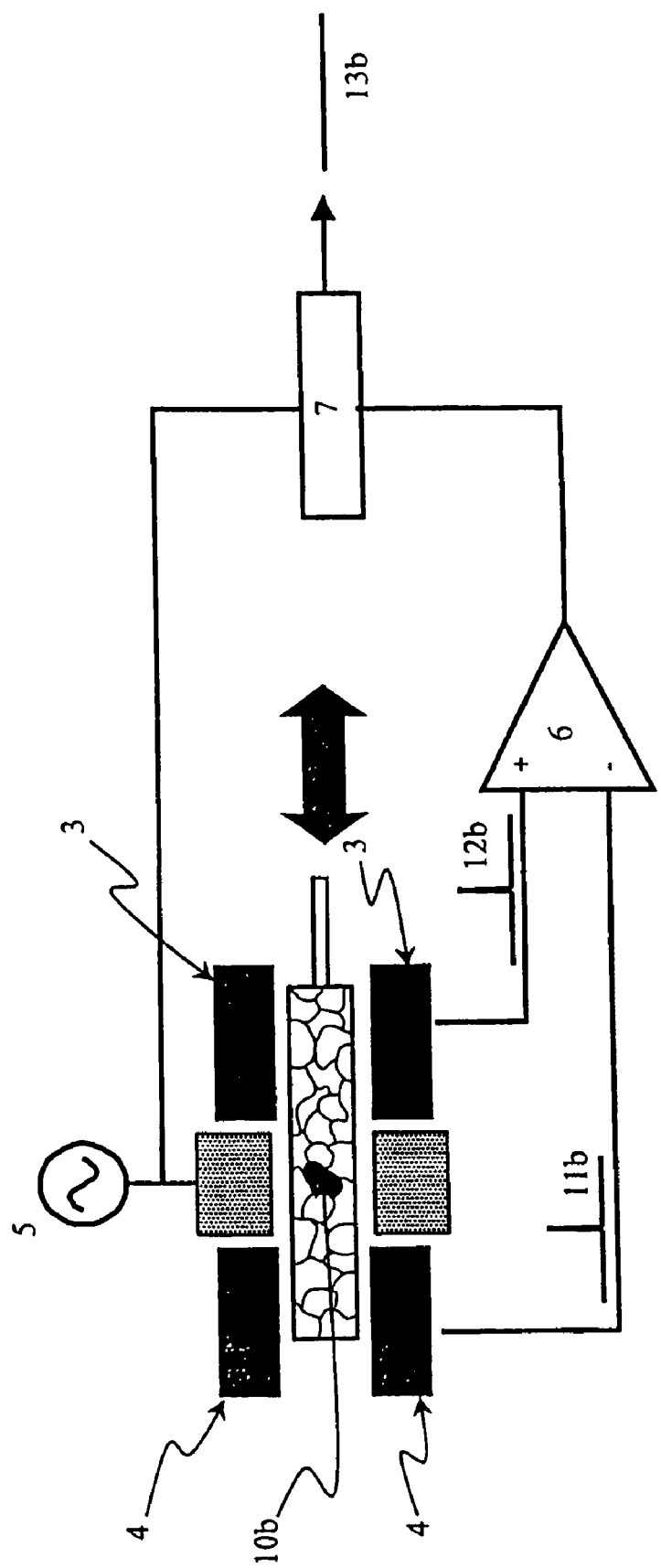
FIG. 7: Origins of common Barkhausen noise in conventional LVDTs.

We have concluded that the current limit on resolution in LVDT sensors is not signal conditioning or display errors but rather Barkhausen noise in the ferromagnetic core. Because the Barkhausen noise often originates from switching of small volumes of magnetic material, the flux changes in each of the two secondaries will not cancel out in the differential measurement. This in turn leads to noise in the core position signal. FIG. 6 and FIG. 7 show how a Barkhausen jump in the ferromagnetic core of a conventional LVDT causes positional noise. Both FIG. 6 and FIG. 7 show the same components as FIG. 1, the conventional LVDT, except that the core 1 of FIG. 1 has been redrawn as a polycrystalline material with a number of defects and grain boundaries that are capable of pinning domain walls, one of which is identified as 10a in FIG. 6 and another as 10b in FIG. 7. In FIG. 6, a Barkhausen jump in the small volume of material 10a couples more flux into the left hand secondary coil 4 than into the right 3. The resulting voltage spike induced in the left secondary coil, represented by 11a, will be larger than the spike induced in the left secondary coil, represented by 12a. When these two voltage spikes go through the differential amplifier 6 and signal conditioning electronics 7 they cause positional noise, represented by 13a. Another aspect of Barkhausen noise making it difficult to remove is illustrated in FIG. 7. In FIG. 7, the Barkhausen jump has occurred in a grain 10b that is serendipitously located equidistant between the two secondaries 3 and 4. Because the jump occurred equidistant from the two secondaries, the induced voltage spikes, represented by 11b and 12b are equal. When these spikes go through the differential amplifier 6 and signal conditioning electronics 7, they cancel and do not lead to positional noise, represented by 13b.

We tested the hypothesis that Barkhausen noise is the limiting source of noise for high sensitivity position measurements in LVDTs. For this purpose, we measured the positional noise of (i) a commercially available LVDT using the as-shipped primary coil and ferromagnetic core (FIG. 1), (ii) commercially available LVDTs in which we had changed the magnetic state of the ferromagnetic core by applying a weak (~10 Oersted) external magnetic field to the core and (iii) a commercially available LVDT in which we had removed the ferromagnetic core and replaced it with a non-ferromagnetic coil form around which a new moving primary coil was wound, the result being functionally equivalent to the LVDT described here.

Figure 8:
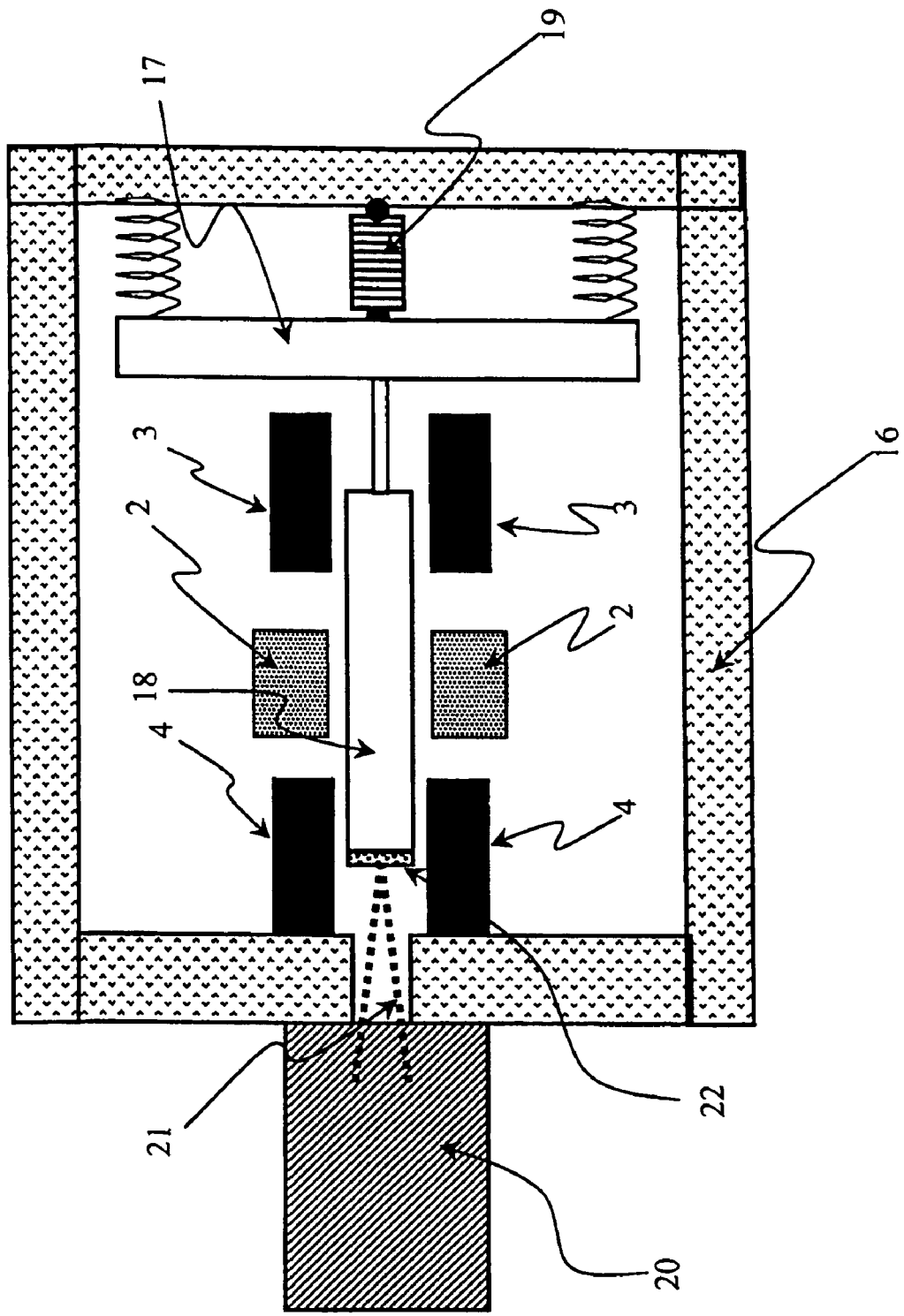
FIG. 8: The apparatus used to quantify sensor noise and sensitivity.

FIG. 8 shows the mechanical apparatus we used for characterizing the noise of these different LVDTs. It consists of a mechanical frame 16 containing a mechanical flexure 17 attached to the moving LVDT core 18, whether any of the several conventional LVDT cores (FIG. 1) or the non-ferromagnetic coil form wound with a moving primary coil. The LVDT secondaries 3 and 4 were connected to the mechanical frame 16, which acted as a reference. A piezo stack 19 pushed on the flexure assembly, moving it with respect to the mechanical reference. In all measurements made with FIG. 8 the piezo was driven with a −15 Volt to +150 Volt 0.1 Hz triangle wave and the same excitation and signal conditioning electronics of FIG. 3 were used. The gain of the signal conditioning electronics was adjusted to give a nominal positional sensitivity of 1.3 µm/V for each measurement. This sensitivity meant that a least-significant bit (LSB) on our 16-bit data acquisition system corresponded to a distance of 0.02 nm.

Figure 9:
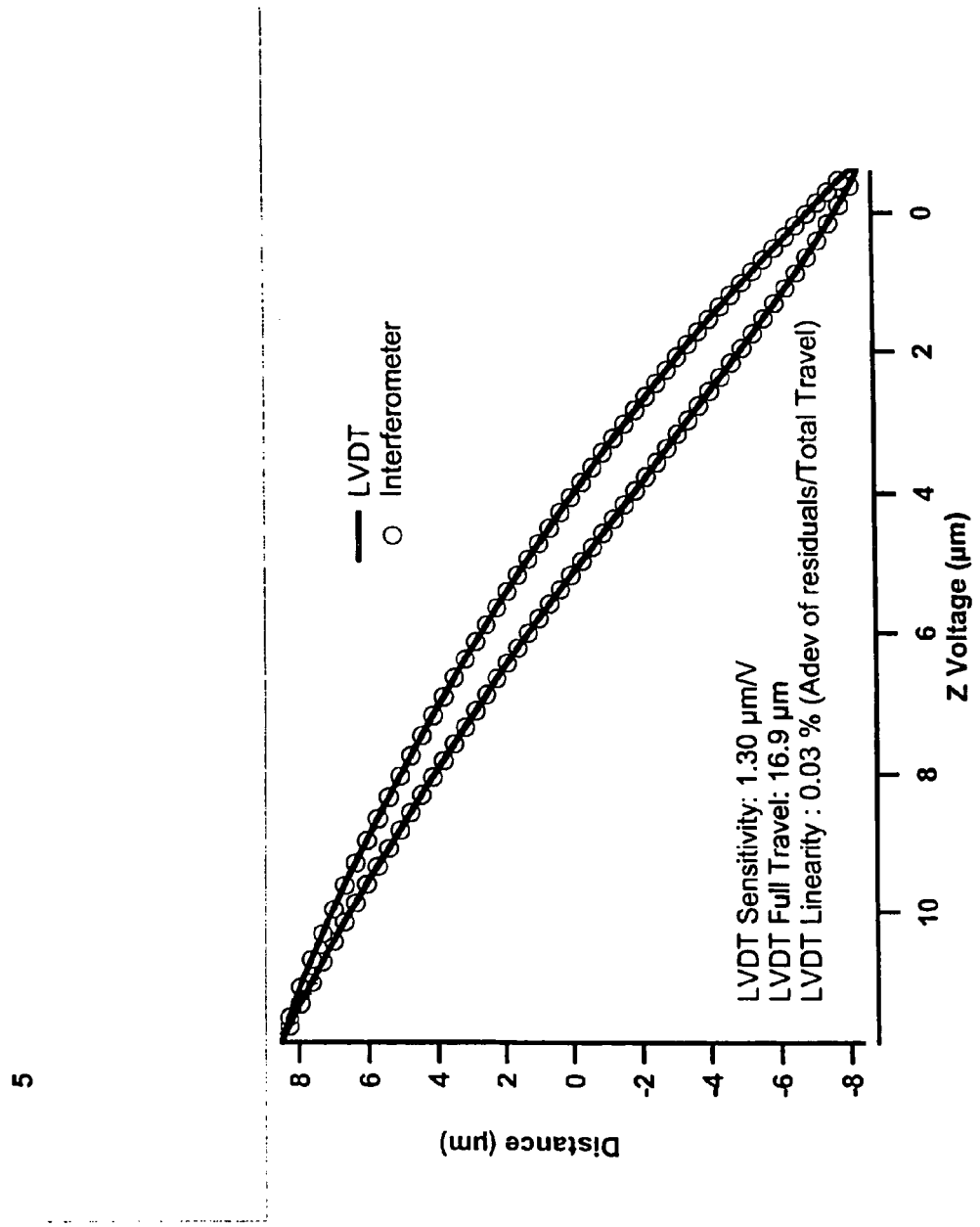
FIG. 9: LVDT sensor output fit to optical interferometer data showing sensitivity and linearity calibration.

A temperature stabilized, HeNe laser interferometer 20 and NIST-traceable calibration gratings of the sort commonly used in atomic force microscopy (Calibration standard, NT-MDT, Moscow, Russia) were used to calibrate the sensitivity and linearity of the different LVDTs. The beam 21 from the laser interferometer was reflected off of the moving core 18 which for this purpose was fitted with a retroreflector 22. We calibrated the different LVDTs by fitting the LVDT response to the interferometer response. FIG. 9 shows the result of this fitting, a piezo hysteresis curve measured with LVDT (iii) identified above, the functional equivalent of our improved LVDT, and with the optical interferometer. The LVDT data (solid lines) has been scaled and offset to match the interferometer data (circles) as closely as possible. As intended, the fitting process has yielded an LVDT sensitivity of 1.30 µm/V. Once the sensitivity of the LVDT has been measured, it is possible to measure the positional noise. For example, one could measure the response of an LVDT to a small movement of the piezo stack as a function of time.

Figure 10:
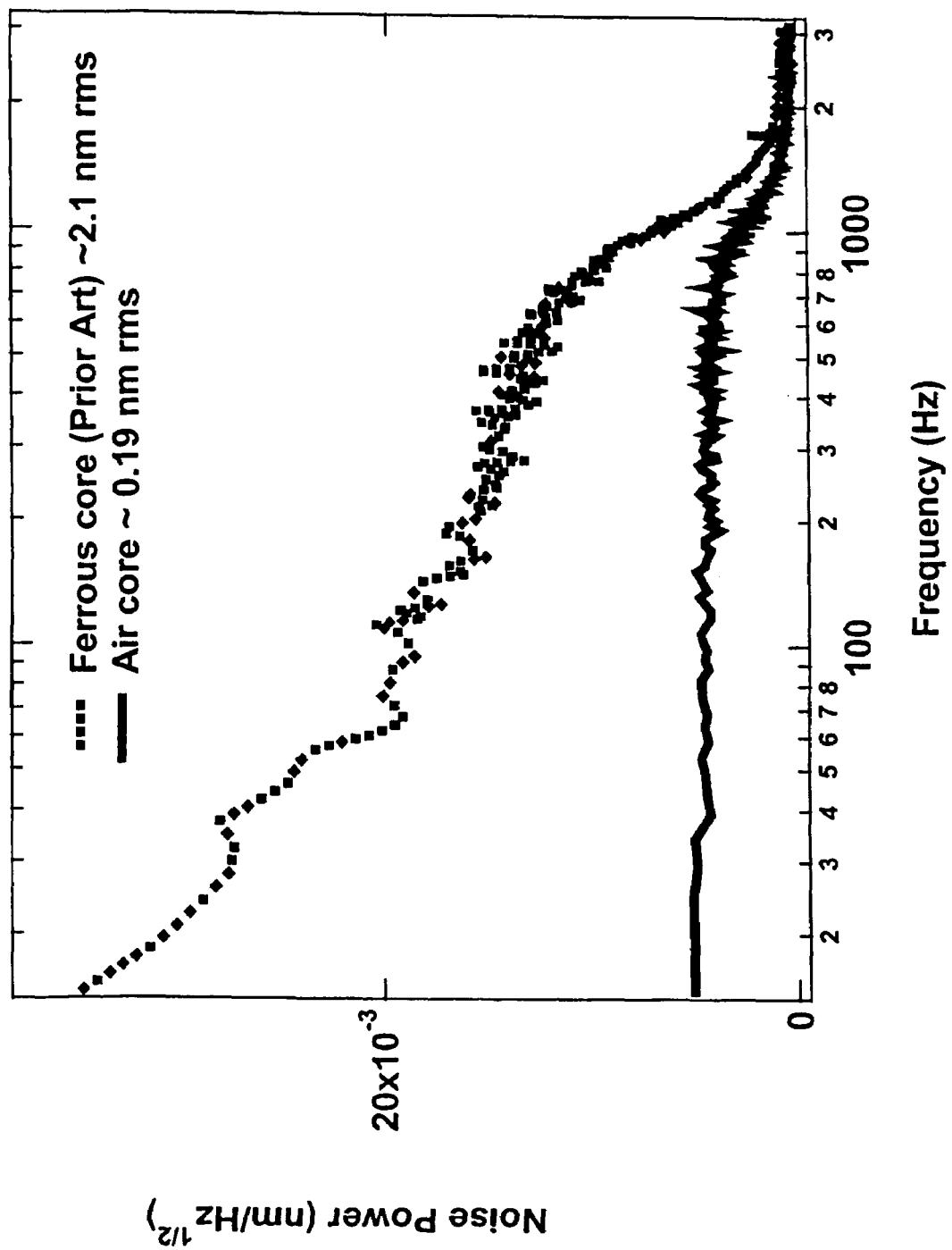
FIG. 10: Noise power spectrum of a conventional (ferromagnetic core) and air core (preferred embodiment) LVDT sensor.

Because they originate from the microscopic distribution of pinning sites in ferromagnetic material, the details of Barkhausen jumps will differ from core to core, even when the cores are constructed from the same material. [1]Furthermore, because the ferromagnetic core is close to a remanent state for a typical first LVDT measurement, the Barkhausen noise will depend on details of the magnetic history of an individual core. FIG. 10 shows the amplitude spectra of the residuals of ferromagnetic-core and non-ferromagnetic-core LVDT responses as a function of frequency. These spectra were derived by measuring noise emanating from the LVDTs in question while at rest and analyzing the measurements with Fourier techniques. As shown in FIG. 10, the amplitude spectrum of the ferromagnetic-core LVDT decreases as a function of frequency, consistent with measurements of Barkhausen noise, while the non-ferromagnetic-core LVDT shows a much reduced and flatter curve. This is consistent with the absence of Barkhausen noise, but with the presence of Johnson noise originating in the feedback resistors of the signal conditioning electronics. The integrated rms noise from 0.1 Hz to 1 kHz was 0.19 nm for the non-ferromagnetic-core LVDT and 2.1 nm for the ferromagnetic-core LVDT.

[1]Urbach defect paper on Barkhausen noise

Figure 11:
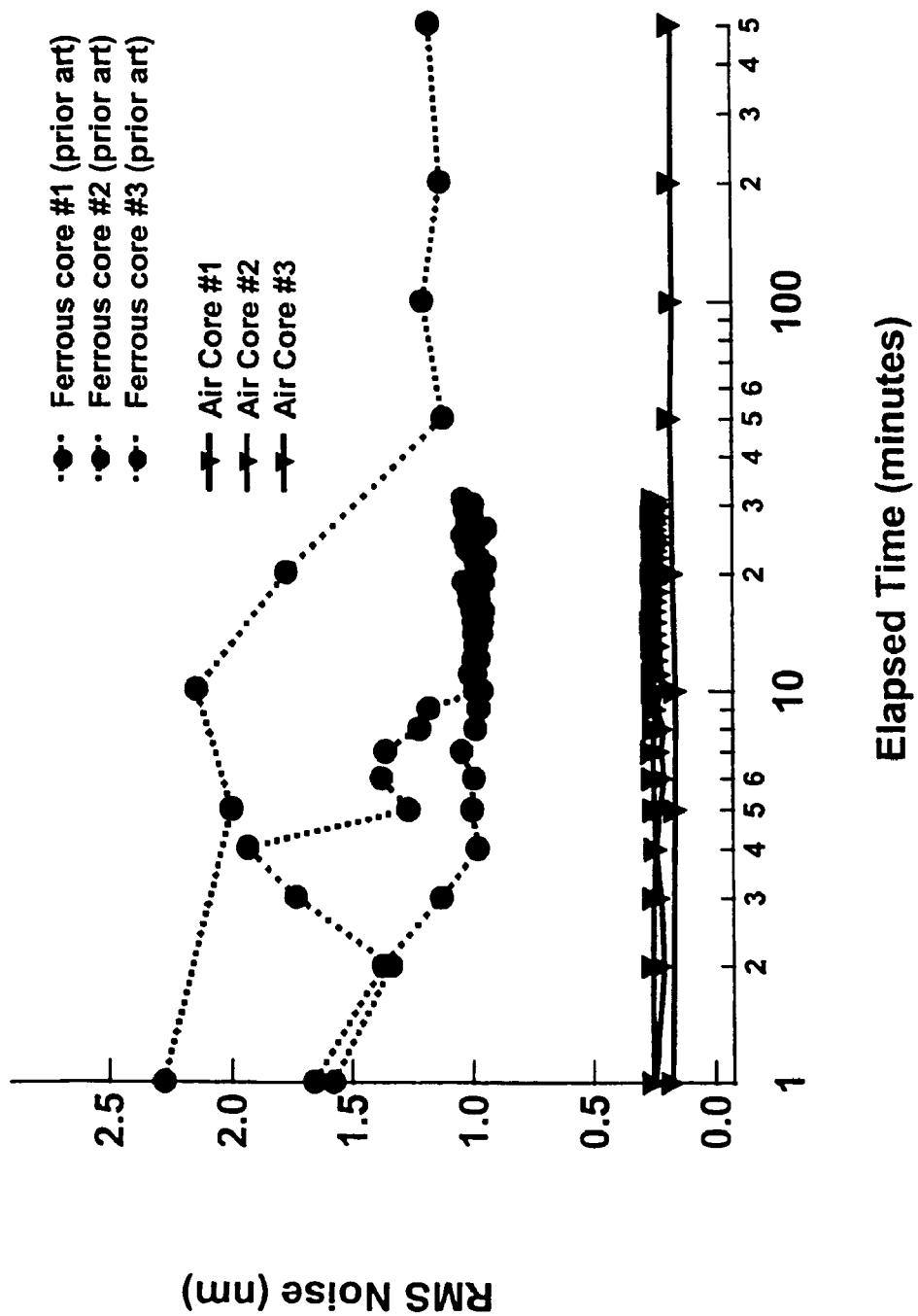
FIG. 11: RMS noise measurements of the several conventional and air core LVDTs as a function of time.

Ferromagnets are frequently in metastable micromagnetic states. These metastable states are typically relatively far from the ground state. There are numerous paths for the ferromagnet to relax towards the ground state. This results in phenomena of slow relaxation where the magnetic state will gradually change over long time scales, typically from hours to days, weeks and even months (see, for example, Bozorth). As the magnetization relaxes towards an ever more stable state, the permeability and stability of the ferromagnet relative to perturbations by an external magnetic field will also change. In general, the domain walls will gradually relax toward a more stable configuration leading to fewer Barkhausen jumps. FIG. 11 shows the measured noise for three conventional ferromagnetic-core LVDTs and three air-core LVDTs as a function of time. The noise of all three conventional ferromagnetic-core LVDTs decreases as a function of time, though not in a smooth manner, and there is considerable variability among the noise level of each core. Both observations indicate Barkhausen noise. During the same period of time, the noise of the three air-core LVDTs remained much more constant at roughly 0.19 nm and there was little variation among the three different air cores. This indicates the noise originates elsewhere: for example, in the excitation or signal conditioning electronics.

Figure 12:
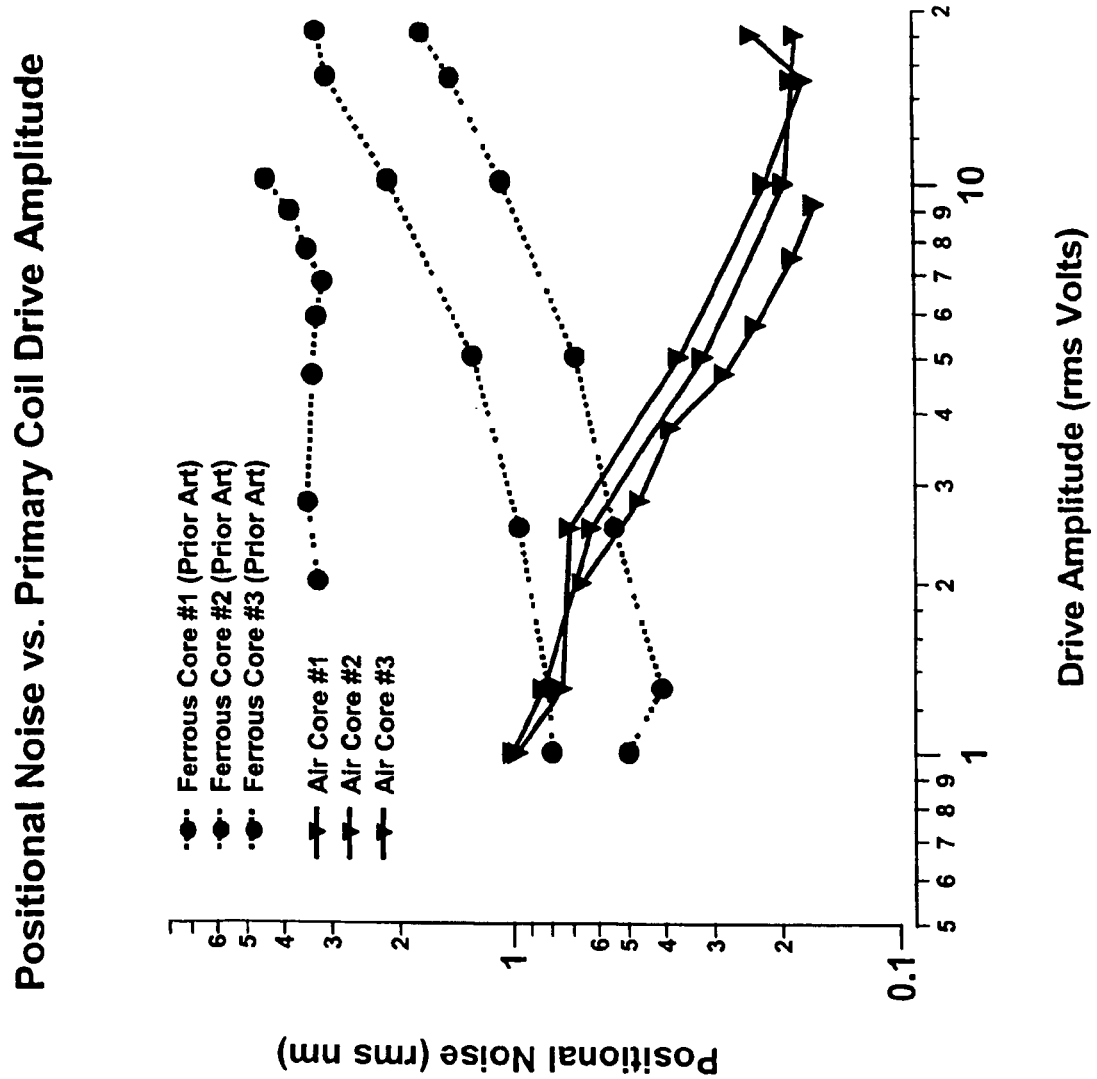
FIG. 12: RMS noise measurements of the several conventional and air core LVDTs as a function of primary excitation amplitude.

One method of increasing the signal to noise is to simply increase the drive current. If the noise is at some constant value, increasing the drive current should simply increase the signal to noise. FIG. 12 shows the noise vs. excitation current curves for three conventional ferromagnetic-core LVDTs and three air-core LVDTs. Air-core noise is roughly inversely proportional to the magnitude of the primary current. This response is consistent with the sensitivity being limited by the excitation and signal conditioning electronics. The noise vs. drive current curves for the ferromagnetic-core LVDTs all have the opposite trend. As the drive current increases, the noise also increases. This indicates Barkhausen noise. When the primary coil drive current increases it creates a larger oscillating magnetic field that can dislodge pinned domain walls, in turn leading to increased positional noise. In addition, the ferromagnetic-core LVDTs in both FIG. 12 and FIG. 11 show much higher variability in their noise performance. This too indicates that the noise is originating from microscopic magnetic variations in each core, that is Barkhausen noise.

It should be noted that the described LVDT can not only convert motion to voltage, but can, in reverse fashion, convert voltage to motion. The following applications of the described LVDT make use of one or both these properties.

Figure 13:
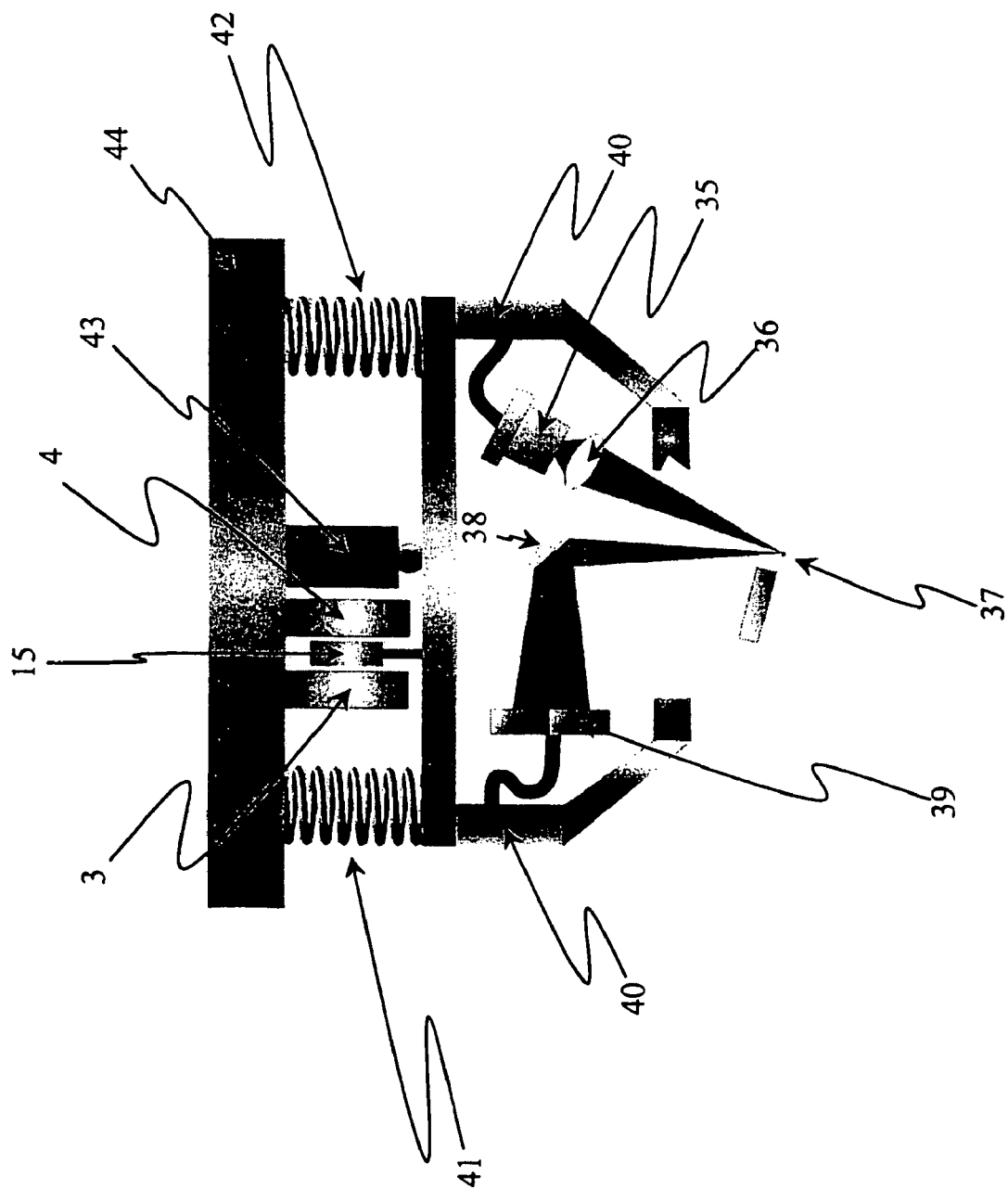
FIG. 13: Molecular force probe using a piezo actuator and LVDT sensor for quantitative single molecule force measurements.

Precision Force Measurements. FIG. 13 represents a molecular force probe instrument used for making localized force measurements and employing the described LVDT in making such measurements. The instrument measures forces by measuring the deflection of a flexible cantilever with a sharp tip 37 as it pushes or pulls on a sample. High sensitivity deflection measurement apparatus and very sharp tips on the end of the flexible cantilever permit measurements down to the range of single molecules. Indentation force measurements can also be made by pushing the cantilever tip into the surface. In FIG. 13, the cantilever 37 is illuminated with a low coherence light source 35. The light from this source is focused onto the cantilever 37 with an adjustable focus lens 36. Light reflecting off of the cantilever is collected by an adjustable mirror 38 and guided onto position sensor 39. The position sensor provides a voltage to a controller for the instrument (not shown) that is proportional to the deflection of the cantilever. The entire optical detection system is enclosed in a rigid, stable capsule 40. The capsule is attached to the frame of the instrument 44 via flexible couplings or flexures 41 and 42. These couplings allow the capsule 40 to translate vertically with respect to the frame of the instrument 44. A piezo stack 43 is used to effect the translation and our improved LVDT sensor, with the moving primary 15 attached to the moving capsule and the stationary secondaries 3 and 4 attached to the fixed frame of the instrument, provides positional information.

Figure 14:
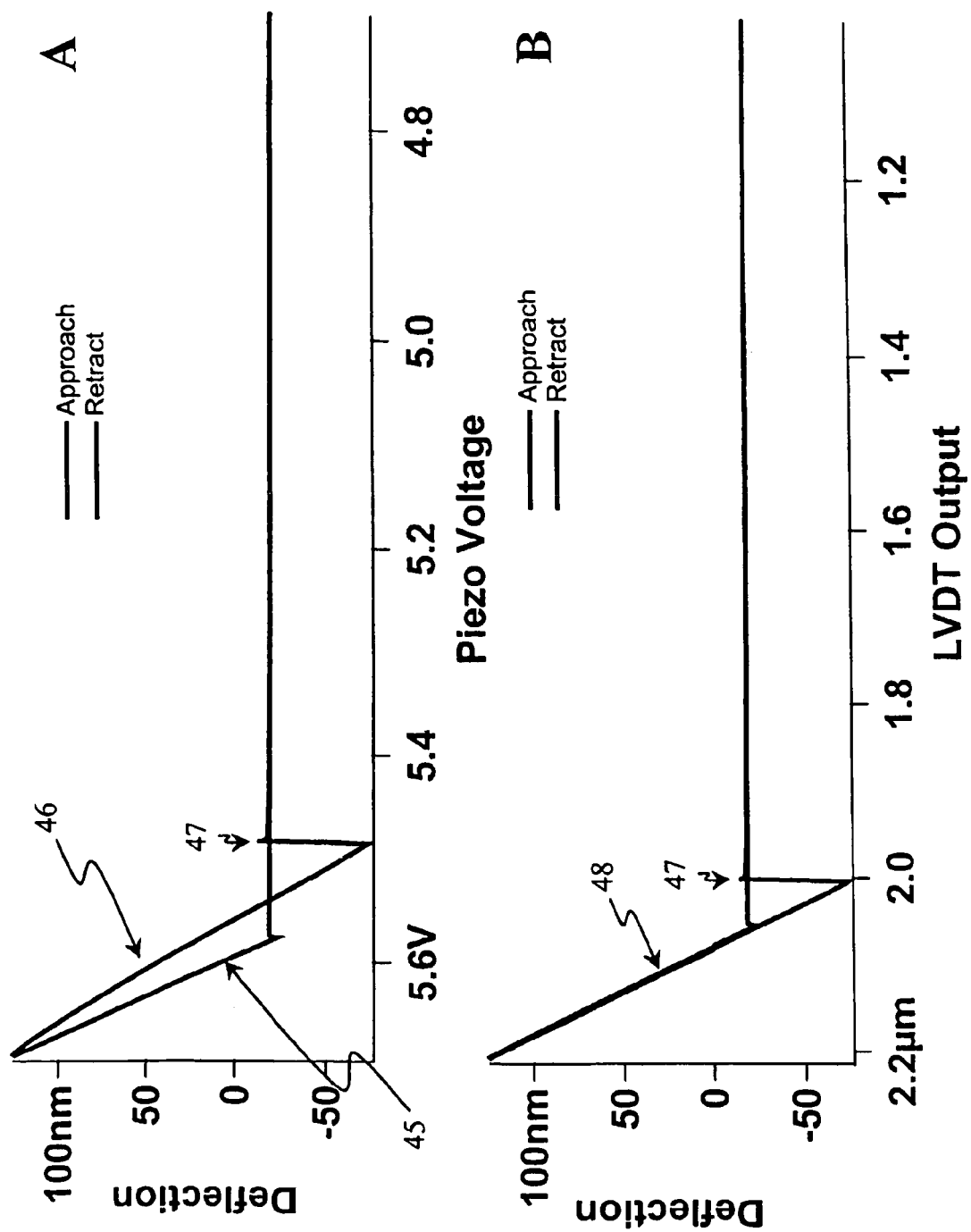
FIG. 14: Force curves made over a hard surface with the molecular force probe made by plotting the cantilever deflection vs. piezo excitation voltage and vs. the LVDT sensor.

FIG. 14 shows the importance of the LVDT sensor in making force measurements. Both panels show a force curve made using a Si cantilever (Nanosensors MESP) over a mica surface in air. Panel A of FIG. 14 is a plot of the cantilever deflection vs. the voltage applied to the piezo. The light trace 45 shows the approach curve and the dark trace 46 the retraction curve. The adhesion between the tip and sample is evident in the retraction curve as is the "snap-off" point 47 at approximately 5.5 volts. As will be noted the contact portion of the approach and retraction curves do not have the same slope. This can be explained as some sort of viscoelastic behavior of the tip or the sample or both. However, it can also be explained as an artifact of piezo hysteresis, leaving us with an uncertainty in the interpretation. Panel B of FIG. 14 shows the same deflection data, this time plotted as a function of the output of our improved LVDT. In this Panel, the contact portions of the approach and retraction curves 47 now have the same slope, ruling out the existence of any viscoelastic effects in tip-sample interaction. Furthermore use of our improved LVDT sensor rules out any possibility of piezo hysteresis artifacts in the force curves. A secondary advantage of the use of our sensor is that it permits direct measurement of displacement (e.g. in microns (as shown) or nanometers) on the x-axis.

Figure 15:
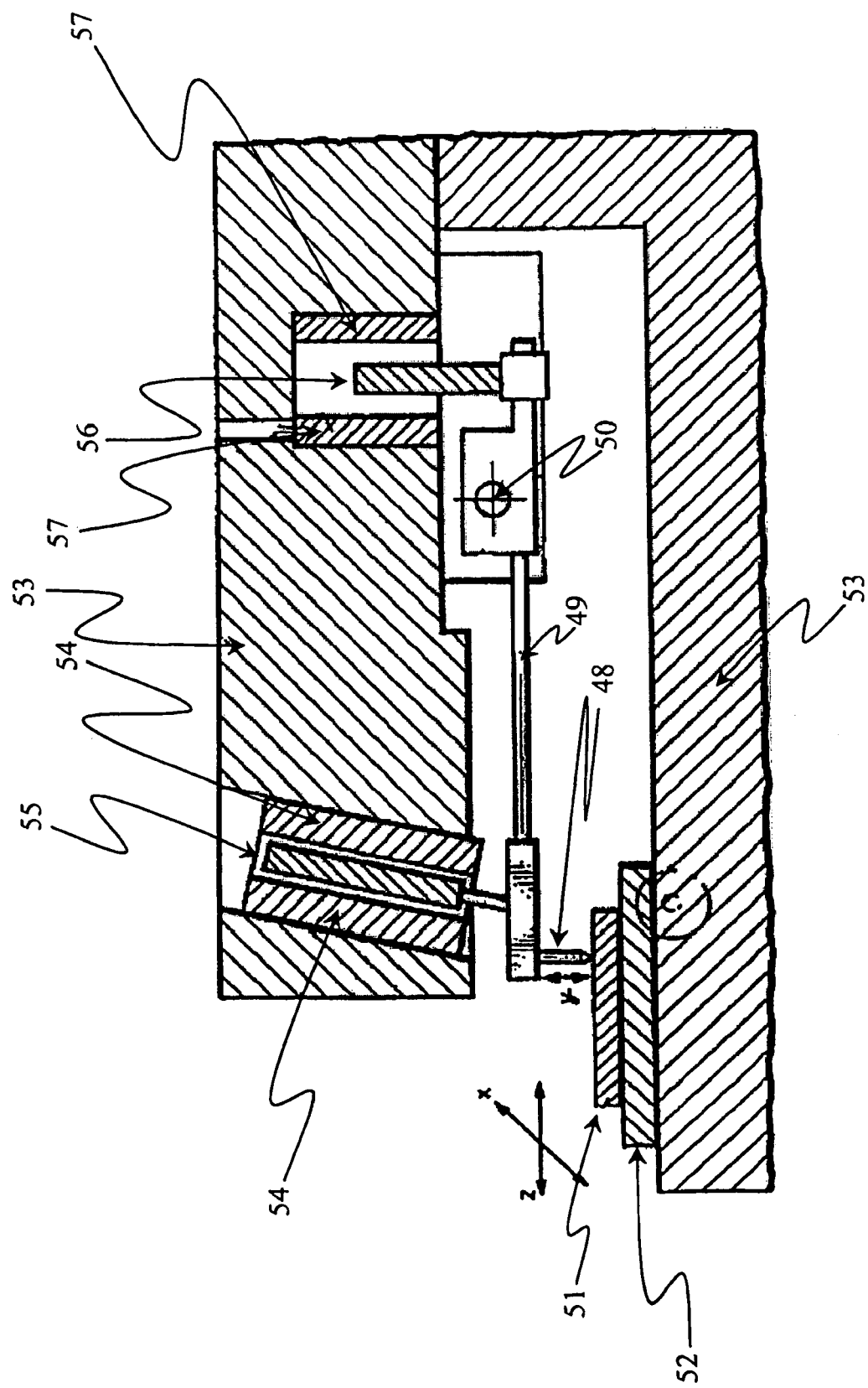
FIG. 15: Prior art showing a surface imaging profilometer with an LVDT sensor and a magnetic actuator for controlling the loading force.

Surface Profiling. Conventional LVDT sensors have been used in a variety of surface profiling instruments, including a number of commercially available instruments (for example the Dektak 8 from Veeco Instruments, Plainview, N.Y.). FIG. 15 shows one such instrument. It is adapted from FIG. 1 of U.S. Pat. No. 4,669,300. In this instrument, a sharp tip 48 attached to a moving stylus 49 is pivoted around a jewel mechanism 50. The tip is in contact with a sample 51 resting on a stage 52 that is scanned relative to the frame of the instrument 53. The motion of the stylus assembly is measured with an LVDT sensor composed of a coil assembly 54 and high permeability ferromagnetic core 55 that moves with the stylus assembly. The force between the tip 48 and the sample 51 can be varied by applying a magnetic field to a magnetic slug 56 attached to the stylus assembly using a magnetic actuating coil 57 attached to the frame of the instrument 53. One major consideration in this design is shielding the primary coil 55 from the magnetic field emanating from the magnetic actuating coil 57 and slug 56. Any stray field from the actuator would change the magnetic state of the high permeability ferromagnetic core 55, causing changes in the sensitivity and/or apparent position of the tip of the stylus assembly 48.

Figure 16:
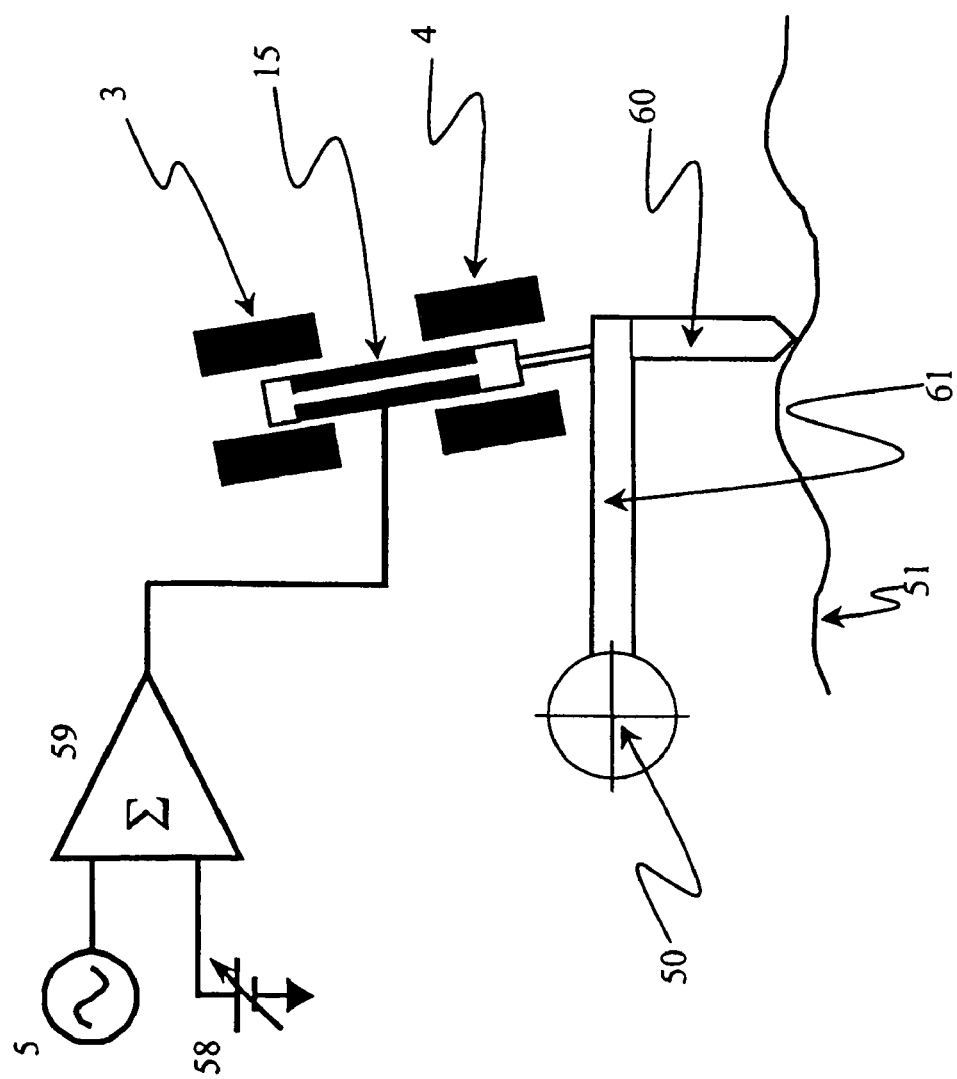
FIG. 16: A surface imaging profilometer with an air core LVDT sensor that can also act as a force actuator for controlling probe location and loading force.

Use of the LVDT described here permits substantially improved profilometry relative to instruments employing a conventional LVDT. This includes surface profiling at higher speeds and lower forces. Moreover, since it is possible to both sense position and apply a force with our improved LVDT, the mass of the instrument can be reduced and its speed increased while allowing for a simplified design. FIG. 16 shows one example of the application of the described LVDT where a dc current 58 is summed with the oscillating primary current 5 via a summing amplifier 59. Insertion of the dc current allows a force to be exerted along the axis of the LVDT primary coil 15. In this embodiment, the sharp tip 60 is attached to a stylus 61 that is moving on a jewel mechanism 50. This entire assembly moves relatively to the sample surface 51. In a variation on this embodiment, the LVDT secondaries 3 and 4 could be driven with a dc current to increase the applied force. As with the use of the primary drive to exert force, this simultaneous force application and sensing are possible because the force drive and the LVDT sensor drive are widely separated in frequency. Since the coil forms of the described LVDT are constructed of non-ferromagnetic material, simultaneous force application and sensing has no effect on the sensitivity or noise of the positional measurement.

Figure 17:
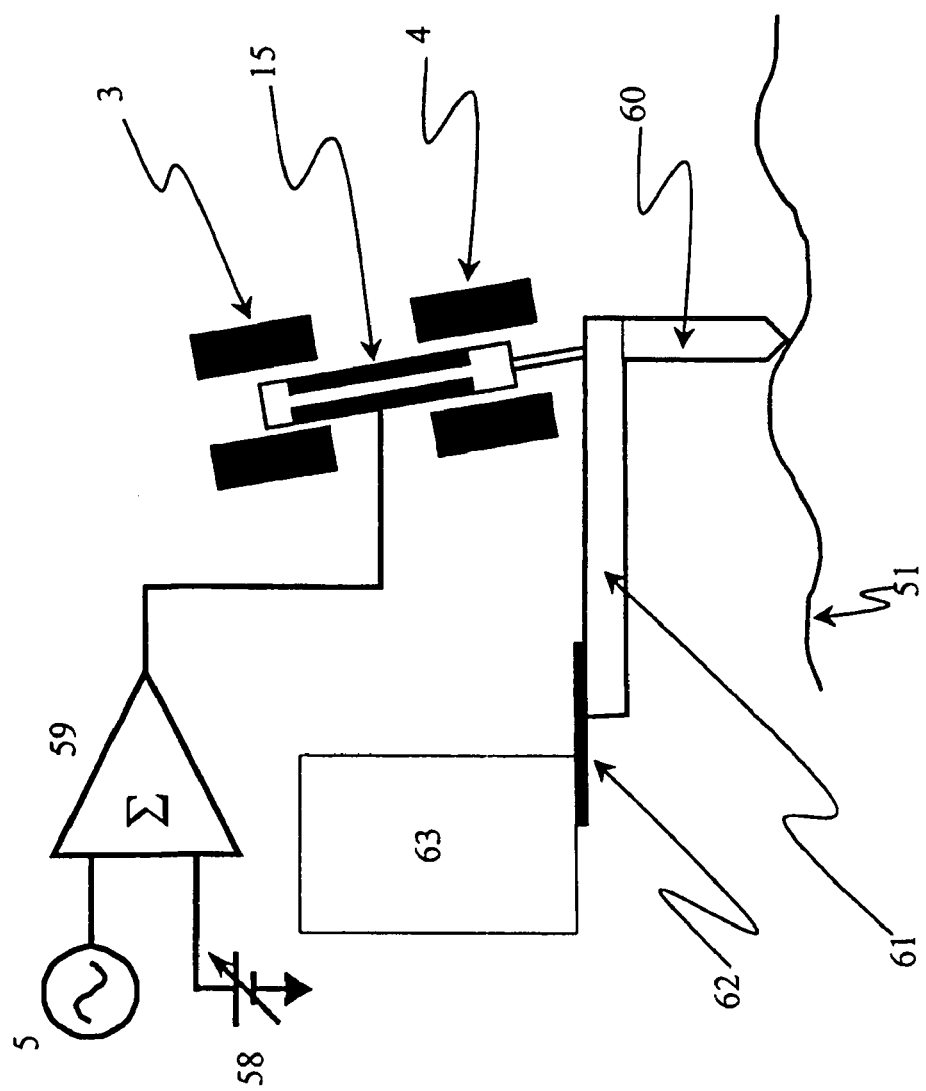
FIG. 17: Same as above where the probe is flexured rather than pivoted.

FIG. 17 shows another embodiment of a profilometer with an LVDT that is used as both a sensor and an actuator. The components of this embodiment are similar to those shown in FIG. 16 with the exception that the stylus 61 is attached to the frame of the instrument 63 (not shown in FIG. 16) via a flexible flexured coupling 62. As with the drive and detection electronics described in FIG. 16 the secondary could also be driven with a dc force actuation current while the high frequency sensor signal was simultaneously measured.

Figure 18:
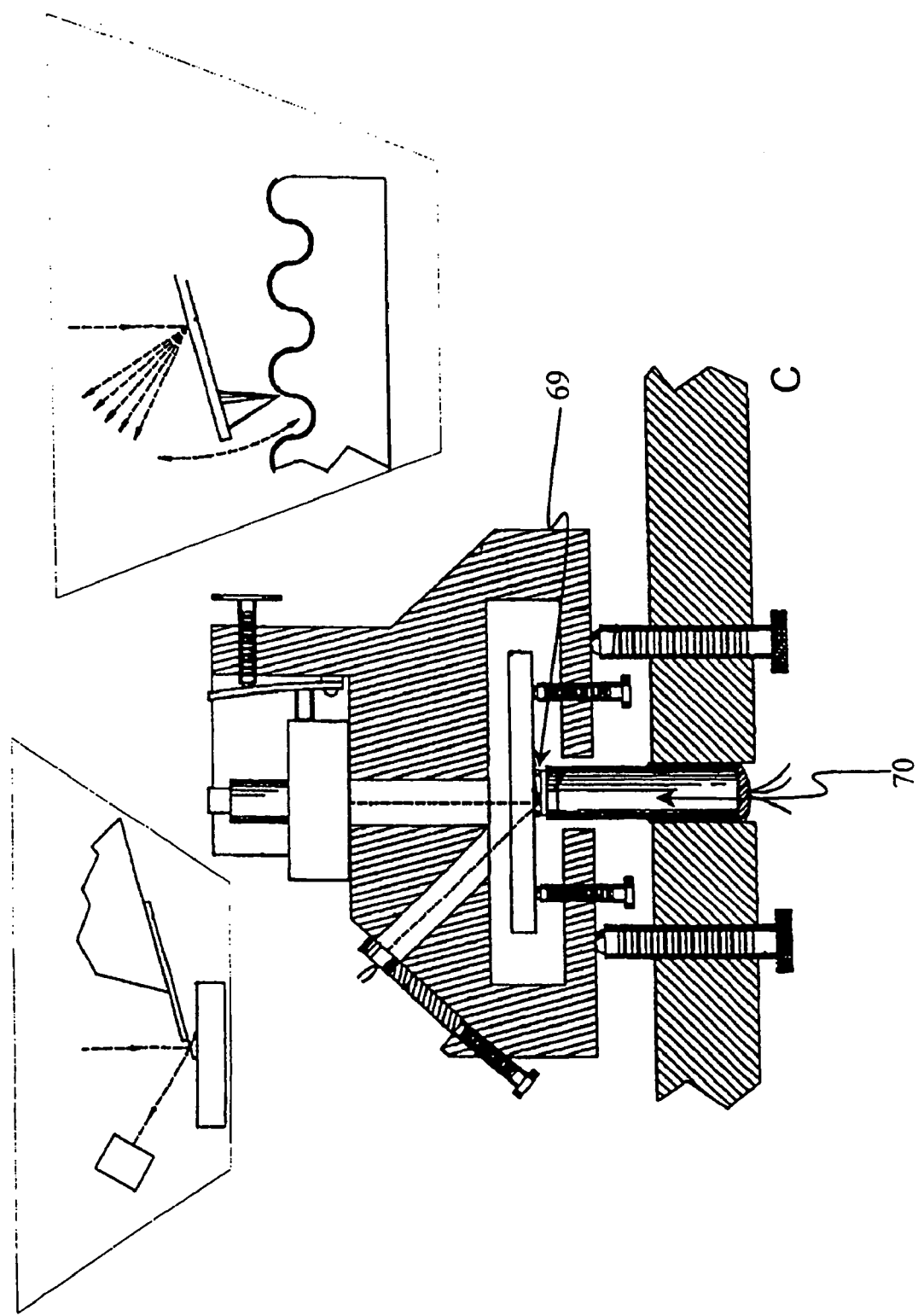
FIG. 18: Prior art showing atomic force microscope.

Atomic Force Microscopy. FIG. 18 shows an atomic force microscope (AFM) adapted from FIG. 3 of U.S. Pat. No. Re 34,489. The AFM is a device used to produce images of surface topography (and other sample characteristics) based on information obtained from scanning a sharp probe on the end of a flexible cantilever over the surface of the sample. Deflections of the cantilever correspond to topographical features of the sample. Typically, the tip-sample position is rastered by an arrangement of piezo tube scanners, sometimes constrained by flexures. In FIG. 18, the sample 69 is positioned in three dimensions using a piezo tube scanner 70. The deflection of the cantilever is measured by an optical lever similar to that shown in FIG. 13. Images are made by plotting the deflection or other mechanical properties of the cantilever as a function of the x-y position of the sample. The instrument can be operated in a number of different imaging modes including an oscillatory mode where the tip only makes intermittent contact with the sample surface. A more detailed description of FIG. 18 is to be found in the referenced patent.

Figure 19:
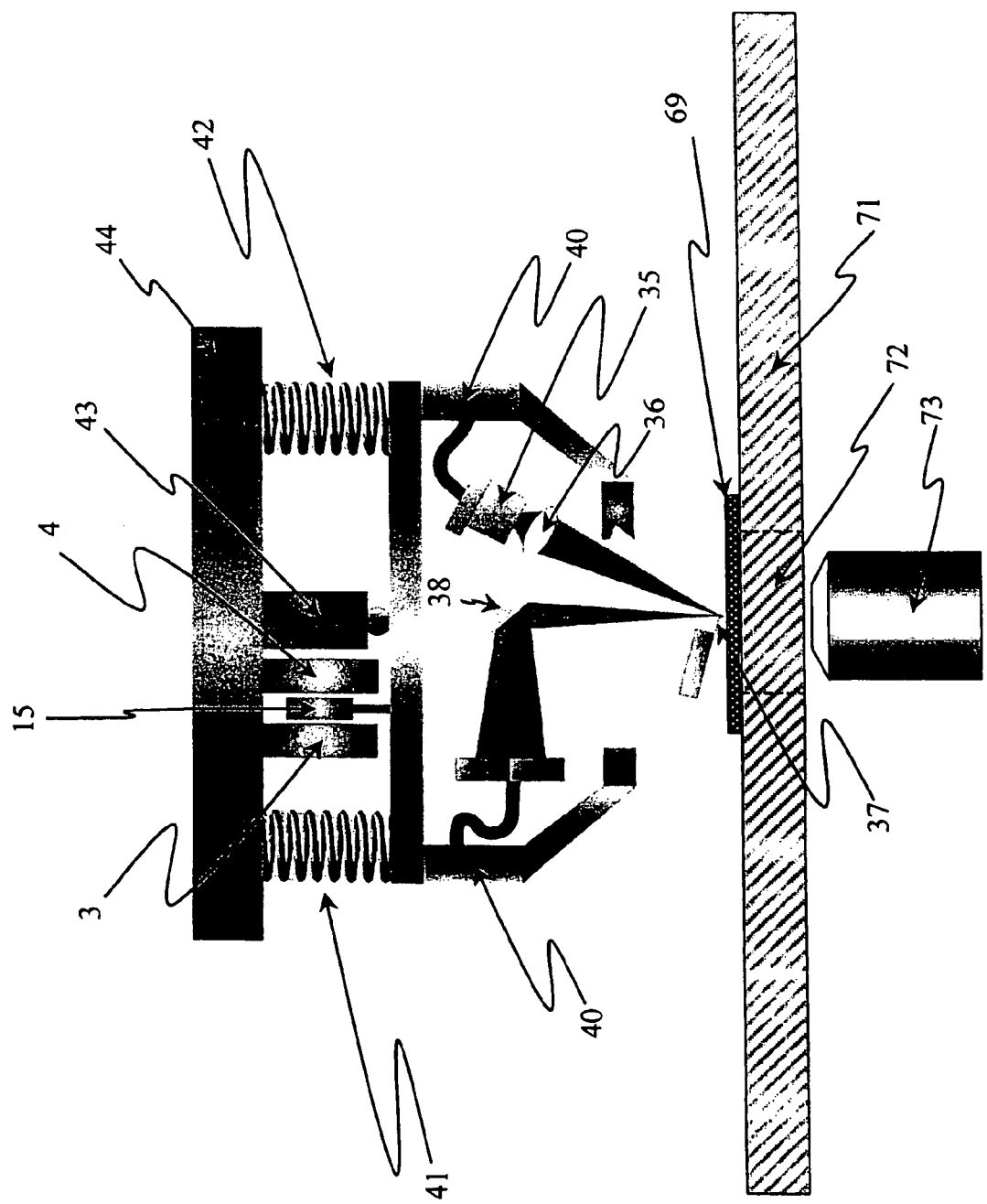
FIG. 19: Molecular force probe-3D, an AFM based around the MFP head and LVDT sensored x-y precision positioning stage.
Figure 20:
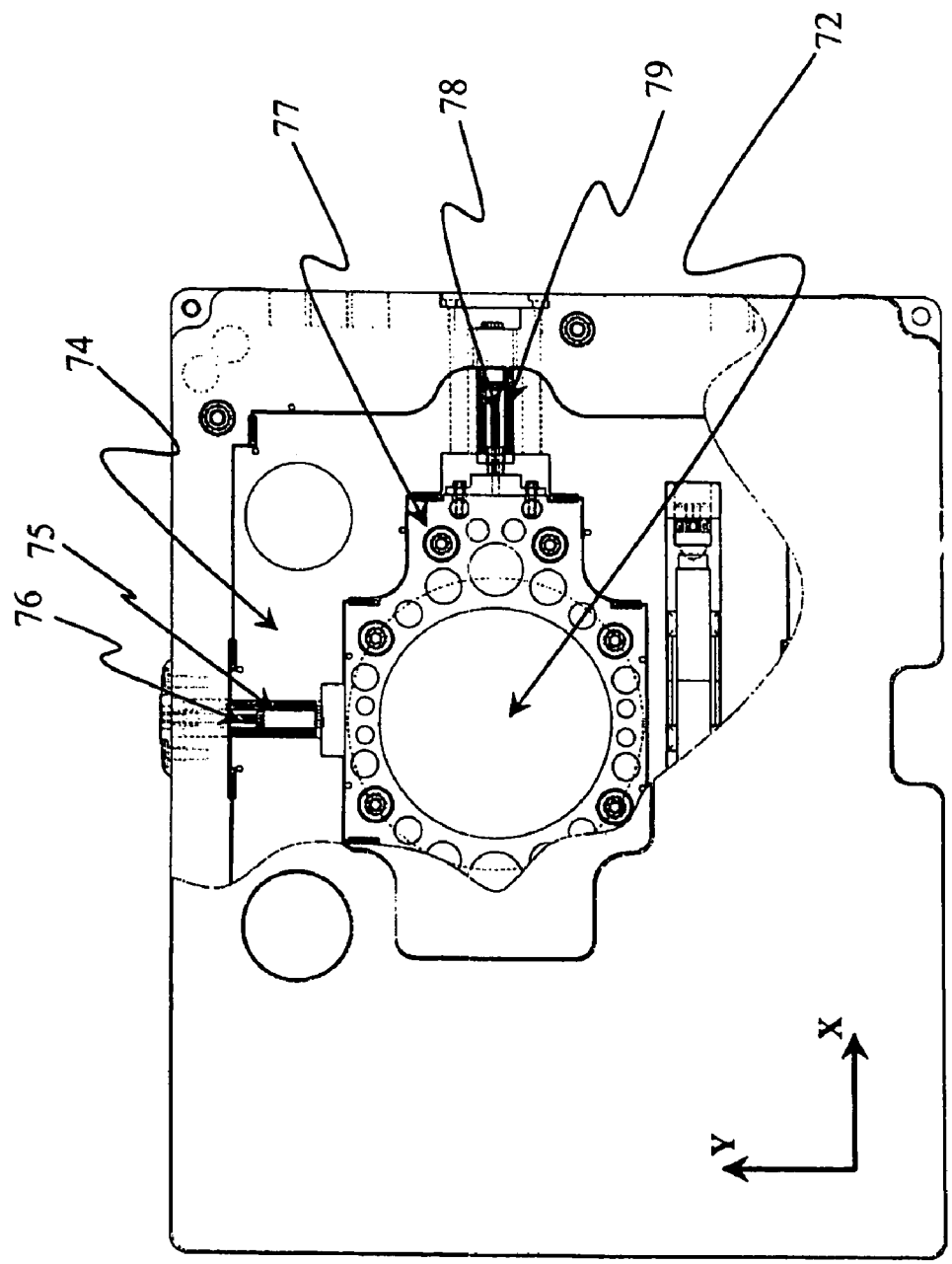
FIG. 20: A more detailed diagram of one embodiment of an x-y positioner that makes use of LVDT position sensors.

FIG. 19 shows a molecular force probe as described in FIG. 13 with AFM functionality. The sample 69 has been mounted on a precision x-y positioning stage 71 permitting the sample to be raster-scanned underneath the MFP. The MFP measures the cantilever deflection as it interacts with the sample surface and generates an image using a variety of imaging modes. In this AFM, unlike the AFM described in FIG. 18, motion along the z-axis is provided by a piezo stack 43 in the MFP, thus decoupling the x-y position from the z-position. This AFM also allows external conventional microscope optics to be aligned with the z-axis of the instrument, this feature being represented by an external objective 73 aligned with the cantilever tip through an optical port 72 in the x-y positioning stage 71. In this arrangement, the sample is scanned relative to both the MFP and to the external optics. FIG. 20 shows a cut-away plan view of one embodiment of an x-y positioning stage that employs the described LVDT to provide precise positional information. FIG. 20 shows the x stage 77 carried on the y stage 74. Movement of the y-stage is accompanied by movement of the y-axis primary 76 and movement of the x-stage by movement of the x-axis primary 78. These movement are sensed by the y-stage and x-stage secondary coil assemblies, 75 and 79, respectively, each mounted to the non-moving frame of the scanner. An optical port 72 in the middle of the positioning stage allows optical access to the sample.

Figure 21:
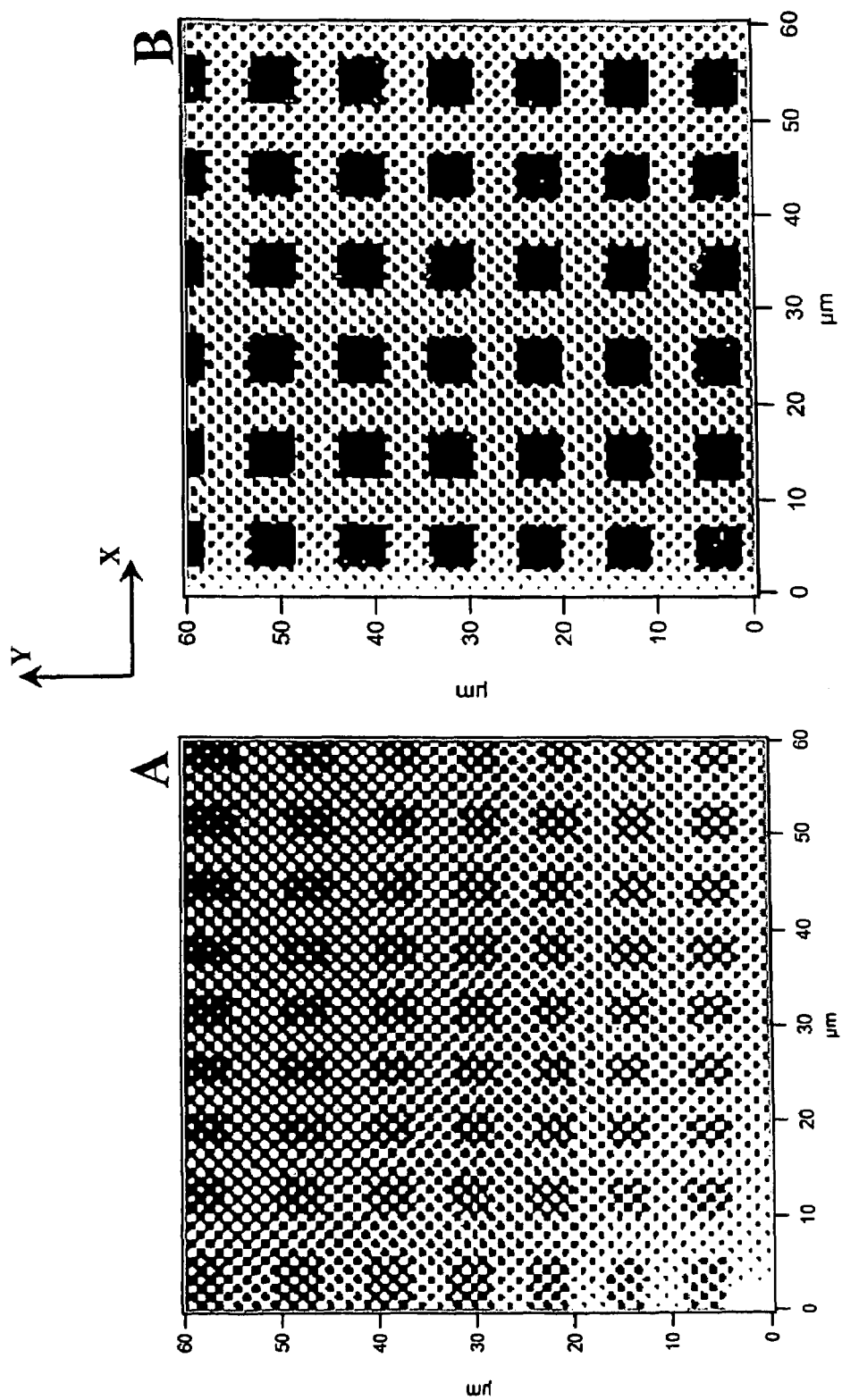
FIG. 21: Two AFM images on a diffraction grating. The first (A) shows an uncorrected AFM scan. The second (B) shows an image where the LVDT sensors were used to linearize the stage movement.

FIG. 21 shows the importance of the described LVDT in generating AFM images. Both panels show images made with the MFP3D equipped with the x-y positioning stage shown in FIG. 20, the stage that uses our improved LVDT. The images were made using a Si cantilever (Nanosensors MESP) over a diffraction grating commonly used for calibrating AFMs consisting of a regular square array of square 5 um pits, nominally 180 nm deep. Panel A was made by simply driving the piezo scanners with a series of triangle waves and using the voltage applied as the measure of sample movement. Panel A shows a distorted image of the diffraction grating pits. They appear neither uniform in size nor do they appear to be in a regular array. Panel B shows the same diffraction grating, this time imaged with closed loop positioning based on the signal from the described LVDT sensors. In this image, the pits appear uniform in size and with uniform spacing, as expected. Analogously with their use in the molecular force probe, the described LVDT sensors have enabled us to accurately reproduce an image of the sample surface by measuring, and correcting for, piezo hysteresis and creep.

Research, development and manufacturing of devices with micron and smaller length scales has begun and is accelerating. Recently, IBM has obtained some results where individual atoms are positioned on a surface with a local probe (in this case, the probe of a scanning tunneling microscope). Precision placement of atoms, a goal of molecular manufacturing will require sub-angstrom positioning of local probes in three dimensions.

The non-ferromagnetic sensors described here lend themselves to the length scale reductions required by these new techniques and devices. The sensitivity of the LVDT is proportional to the geometric sensitivity of the mutual inductance $$\frac{dM}{dx}.$$

The mutual inductance is proportional to the magnetic energy and inversely proportional to the square of current, $$M \propto \frac{\text{Magnetic Energy}}{\text{Current}^2}.$$

If we keep the number of turns constant by reducing the wire dimensions, it is easy to show that the mutual inductance is independent of the coil length l. On the other hand, the derivative of the mutual inductance is inversely proportional to the coil length, $$\frac{dM}{dx} \propto l^{-1}.$$

Thus the sensitivity, $$\text{Sensitivity} \propto \frac{dM}{dx} \propto l^{-1},$$

increases as the LVDT coil lengths decrease. This relationship implies that the LVDT sensitivity will only get better as the coil length decreases.

As the length scale of sensors and devices decrease, magnetic sensors have another advantage. Magnetic forces scale as $l^{-4}$. This implies that the forces resulting from simply operating the sensor will scale favorably in the case of a MEMs or smaller sized non-ferromagnetic LVDT.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of the invention.

What is claimed is:

1. A position sensor, comprising:
  a moving coil part, having a first coil form that is constructed of a paramagnetic material, and a coil element having an electrical connection part, formed around said first coil form, said moving coil part constrained to move in a linear direction, and said moving coil part including a connection element adapted for connection to a moving object of interest;
  a stationary coil part, having a second coil form also constructed of a paramagnetic material, and a second coil element wound on said second coil form, with said second coil element having at least first and second electrical connections which produce an output signal indicative of a moving relationship between said moving coil part and said stationary coil part, said stationary coil part sufficiently close to said moving coil part such that magnetic flux from said moving coil part is induced into said stationary coil part, wherein said first and second coil forms are formed of solid, paramagnetic material.

2. A position sensor as in claim 1, further comprising excitation electronics, producing a first waveform of a specified type, connected to said electrical connection part of said moving coil part to excite said moving coil part with said first waveform.

3. A position sensor as in claim 2, further comprising signal processing electronics, connected to said first and second electrical connections of said stationary coil part, and receiving voltages from said first and second stationary coil part induced by movement of said moving coil part.

4. A position sensor as in claim 2, wherein said excitation electronics includes a square wave generator, and a low pass filter, filtering an output of said square wave generator to remove substantially all harmonics of the square wave above a desired fundamental frequency.

5. A position sensor as in claim 1, further comprising a shell, surrounding said position sensor, said shell formed of a material which does not shield against magnetic fields.

6. A position sensor as in claim 5, wherein said shell is formed of a material which produces a magnetic field.

7. A position sensor as in claim 1, further comprising said moving object of interest.

8. A position sensor as in claim 7, wherein said object of interest includes a connection to a molecular force probe.

9. A position sensor as in claim 7, wherein said object of interest includes a connection to a surface profiling instrument.

10. A position sensor as in claim 7, wherein said object of interest includes a connection to an atomic force microscope.

* * * * *